(12) United States Patent
Snyder

(10) Patent No.: US 7,158,950 B2
(45) Date of Patent: Jan. 2, 2007

(54) PROCESS FOR CREATING A FINANCIAL PLAN FOR FUNDING OF COLLEGE EDUCATION

(75) Inventor: Wesley A. Snyder, Oley, PA (US)

(73) Assignee: Keith A. Snyder, Eastchester, NY (US)

( * ) Notice: Subject to any disclaimer, the term of this patent is extended or adjusted under 35 U.S.C. 154(b) by 0 days.

(21) Appl. No.: 11/095,990

(22) Filed: Mar. 31, 2005

(65) Prior Publication Data
US 2005/0171820 A1 Aug. 4, 2005

Related U.S. Application Data

(63) Continuation-in-part of application No. 10/159,182, filed on May 31, 2002.

(60) Provisional application No. 60/354,373, filed on Feb. 5, 2002.

(51) Int. Cl.
G06Q 40/00 (2006.01)
(52) U.S. Cl. ........................................................ 705/35
(58) Field of Classification Search .................. 705/35, 705/36 R
See application file for complete search history.

(56) References Cited

U.S. PATENT DOCUMENTS

| | | | |
|---|---|---|---|
| 4,752,877 A * | 6/1988 | Roberts et al. ........... | 705/36 R |
| 6,012,044 A * | 1/2000 | Maggioncalda et al. .. | 705/36 R |
| 6,021,397 A * | 2/2000 | Jones et al. ............... | 705/36 R |
| 6,963,852 B1 * | 11/2005 | Koresko ..................... | 705/35 |
| 2002/0103733 A1 * | 8/2002 | Barrington et al. ........... | 705/35 |
| 2003/0110061 A1 * | 6/2003 | Lakenbach et al. ............ | 705/4 |
| 2004/0236652 A1 * | 11/2004 | Heiges et al. .................. | 705/35 |
| 2005/0060253 A1 * | 3/2005 | Paulsen-Dziuk et al. ...... | 705/35 |
| 2006/0080202 A1 * | 4/2006 | Ireland et al. ................ | 705/35 |
| 2006/0167780 A1 * | 7/2006 | Friedman ..................... | 705/35 |
| 2006/0184442 A1 * | 8/2006 | Krasnerman et al. ......... | 705/35 |
| 2006/0190372 A1 * | 8/2006 | Chhabra et al. .............. | 705/35 |

FOREIGN PATENT DOCUMENTS

JP 10003505 A * 1/1998

OTHER PUBLICATIONS

Pennsylvania Bulletin, Rules and Regulations, Title 22- Education, vol. 26, No. 28, Jul. 13, 1996 pp. 3321-3342.*
Federal Loan Consolidation Programs web page, prior to Jun. 30, 2002, 3 pages.*
Student Loans and Federal Load consolidation, printout from NextStudent, Inc. web site: http://www.nextstudent.com/consolidation_loans/consolidation_loans.asp, copyright © 2004 NextStudent, Inc., printout date: Apr. 14, 2004, 2 pages.
"PLUS Loans (Loans to Parents)." The Student Guide 2002-3—Financial Aid from the U.S. Department of Education, publication of the U.S. Department of Education, Washington, DC, printout from web site: http://www.ed.gov/prog_info/SFA/Student Guide/2002-3/plus.html, printout date: Aug, 27, 2002, original posting date is unknown, 3 pages.

(Continued)

Primary Examiner—Charles R. Kyle
(74) Attorney, Agent, or Firm—Akin Gump Strauss Hauer & Feld, LLP

(57) ABSTRACT

A computer-implemented process creates a financial plan for parental funding of a student's college education. The plan includes a variable life insurance policy, a schedule of estimated college loans to be applied for by the parent for each of the years of attendance by the student, consolidation loan recommendations for consolidation of the annual college loans, including monthly debt servicing amounts for the consolidation loan, and debt servicing recommendations for making withdrawals or loans against the accumulated value of the life insurance policy to pay at least some of the monthly debt servicing amounts of the consolidation loan.

14 Claims, 44 Drawing Sheets

OTHER PUBLICATIONS

Student Loans and Federal Loan consolidation, printout from NextStudent, Inc. web site: http://www.nextstudent.com/consolidation_loans/consolidation_loans.asp, copyright © 2004 NextStudent, Inc., printout date: Apr. 14, 2004, 2 pages.

* cited by examiner

| PARENT INFORMATION | | |
|---|---|---|
| | *Father* | *Mother* | *Last* |
| Name | Jim | Sue | Smith |
| Birth Year | 1967 | 1969 | |
| Current Life Insurance Coverage | $0 | $0 | |
| Accidental Death & Coverage | $0 | $0 | |
| Annual Income | $50,000 | $35,000 | |
| Street Address 1 | 123 Main Street | | |
| Street Address 2 | | | |
| City | Anytown | | |
| State | PA | | |
| Zip Code | 99999 | | |
| Phone | | | |
| Parents' Federal Tax Bracket | 28% | | |
| Parents' Adjusted Gross Income | $78,000 | | |
| Parents' Untaxed Income and Benefits | $3,000 | | |
| US Income Tax Paid Last Year | $13,000 | | |
| Parents' Cash, Checking, Savings, and Investments | $30,000 | | |
| Parents' Net Worth of Business or Farm | $0 | | |

*Fig. 11A*

| CHILDREN'S INFORMATION | | | | |
|---|---|---|---|---|
| | Child 1 | Child 2 | Child 3 | Child 4 |
| Name | Son | Daughter | | |
| Gender | Male | Female | | |
| Birth Year | 2001 | 2003 | | |
| Annual Income | $0 | $0 | | |
| Adjusted Gross Income | $0 | $0 | | |
| Untaxed Income and Benefits | $0 | $0 | | |
| US Income Tax Paid Last Year | $0 | $0 | | |
| Cash, Checking, Savings, and Investments | $2,000 | $500 | | |
| Net Worth of Business or Farm | $0 | $0 | | |
| Federal Tax Bracket | 10% | 10% | | |
| Percent of College to be covered by parents | 100% | 100% | | |
| College to attend | Harvard U | Penn State Park | | |
| Plan for Total Cost or Expected Cost after Financial Aid | Expected | Expected | | |
| College Start Year | 2019 | 2021 | | |
| Years to complete college | 4 | 4 | | |

*Fig. 11B*

| GENERAL INFORMATION | | | |
|---|---|---|---|
| | Year 1 | Year 2 | Year 3 | Year 4 |
| Lump Sum Investment(s) | $0 | $0 | $0 | $0 |
| | Year 5 | Year 6 | Year 7 | Year 8 |
| | $0 | $0 | $0 | $0 |
| Number of Years to Save | 18 | | | |
| Expected Rate of Return on Investments | 12% | | | |
| Insured | Father | Mother | Total | |
| Amount of Insurance Needed for Family Needs | $300,000 | $100,000 | $400,000 | |
| Savings Start Year | 2004 | | | |
| % Increase in Savings Per Year | 0% | | | |

| | Monthly | Amount Funded | Amount of Insurance |
|---|---|---|---|
| Computed Annual Investment | $3,182 | 90% | $111,115 |
| Computed Annual Investment | $3,969 | 25% | $400,000 |

*Fig. 11C*

ASSETS

| | Father | Mother | Both |
|---|---|---|---|
| Cash (savings accts, CD's, money-market funds) | | | $5,000 |
| Stocks, Bonds, Mutual Funds | | | $25,000 |
| Retirement Accounts | | | |
| Cash Value of Life Insurance Policies | | | |
| Value of primary residence | | | $250,000 |
| Investment or Rental Property(s), 2nd Home, Vacation Property | | | |
| Cars- Total Value | | | $30,000 |
| Other | | | |

LIABILITIES

| | Term (yrs) | Original | Balance | Rate | Monthly Pmt |
|---|---|---|---|---|---|
| Mortgage 1 | 30 | $200,000 | $130,000 | 6.5% | |
| Mortgage 2 | | | | | |
| Home-equity loan | 5 | $25,000 | $20,000 | 7.0% | |
| Car Loan 1 | 5 | $20,000 | $8,000 | 7.0% | $220 |
| Car Loan 2 | 5 | $20,000 | $18,000 | 2.0% | $129 |
| Student Loan | 10 | $6,000 | $4,000 | 4.0% | $100 |
| Credit Card 1 | | | $3,000 | 14.0% | |
| Credit Card 2 | | | $2,000 | 16.0% | |
| Credit Card 3 | | | $5,000 | 18.0% | |
| Other | | | | | |

*Fig. 11D*

| Plan Year | | 1 | 2 | 3 | 4 | 5 | 6 | 7 | 8 |
|---|---|---|---|---|---|---|---|---|---|
| Year | Totals | 2004 | 2005 | 2006 | 2007 | 2008 | 2009 | 2010 | 2011 |
| | | Prior | Prior | Prior | Prior | Prior | Prior | Prior | Prior |
| Beginning | | 0 | 2996 | 6353 | 10045 | 14107 | 18580 | 23507 | 28941 |
| Cash In | | | | | | | | | |
| Premiums | $57,267 | 3182 | 3182 | 3182 | 3182 | 3182 | 3182 | 3182 | 3182 |
| Investment Return | $2,338,992 | 297 | 629 | 995 | 1398 | 1841 | 2329 | 2867 | 3462 |
| Total | $1,130,388 | 3478 | 3811 | 4177 | 4579 | 5022 | 5510 | 6049 | 6644 |
| Cash Out | | | | | | | | | |
| VUL costs | $74,323 | 483 | 454 | 485 | 517 | 550 | 583 | 615 | 638 |
| Withdrawals | $57,267 | 0 | 0 | 0 | 0 | 0 | 0 | 0 | 0 |
| Total | $107,710 | 483 | 454 | 485 | 517 | 550 | 583 | 615 | 638 |
| Ending Cash Value | $1,122,657 | 2996 | 6353 | 10045 | 14107 | 18580 | 23507 | 28941 | 34946 |
| Actual Loan Payments Due | | | | | | | | | |
| Consolidated | $385,718 | 0 | 0 | 0 | 0 | 0 | 0 | 0 | 0 |
| Loan Balances | | | | | | | | | |
| Consolidated | $0 | 0 | 0 | 0 | 0 | 0 | 0 | 0 | 0 |
| VUL | $1,142,012 | 0 | 0 | 0 | 0 | 0 | 0 | 0 | 0 |
| Amount of Insurance | | | | | | | | | |
| Death Benefit | | 111115 | 111115 | 111115 | 111115 | 111115 | 111115 | 111115 | 111115 |
| Surrender Value | | 2253 | 5611 | 9377 | 13513 | 18060 | 23061 | 28569 | 34649 |
| Total | | 113369 | 116726 | 120492 | 124628 | 129175 | 134176 | 139685 | 145764 |
| Account Equity (Surrender Value - College Loan Balances) | | 2253 | 5611 | 9377 | 13513 | 18060 | 23061 | 28569 | 34649 |
| Internal Rate of Return | | -29.17% | -6.10% | -0.59% | 1.51% | 2.57% | 3.20% | 3.62% | 3.93% |

FIG. 12A

| 9 | 10 | 11 | 12 | 13 | 14 | 15 | 16 | 17 | 18 | 19 | 20 | 21 |
|---|---|---|---|---|---|---|---|---|---|---|---|---|
| 2012 | 2013 | 2014 | 2015 | 2016 | 2017 | 2018 | 2019 | 2020 | 2021 | 2022 | 2023 | 2024 |
| Prior | Prior | Prior | Prior | Prior | Prior | Prior | Freshman | Sophomore | Junior | Senior | After | After |
| 34946 | 41584 | 48922 | 57035 | 66006 | 75896 | 86799 | 98821 | 108929 | 119186 | 128376 | 132961 | 136051 |
| 3182 | 3182 | 3182 | 3182 | 3182 | 3182 | 3182 | 3182 | 3182 | 3182 | 0 | 0 | 0 |
| 4120 | 4847 | 5651 | 6540 | 7519 | 8600 | 9791 | 10792 | 11809 | 12719 | 13173 | 13480 | 13578 |
| 7302 | 8029 | 8832 | 9721 | 10701 | 11781 | 12972 | 13974 | 14990 | 15901 | 13173 | 13480 | 13578 |
| 664 | 690 | 719 | 750 | 811 | 878 | 950 | 802 | 842 | 886 | 917 | 722 | 732 |
| 0 | 0 | 0 | 0 | 0 | 0 | 0 | 3063 | 3892 | 5825 | 7672 | 9667 | 11853 |
| 664 | 690 | 719 | 750 | 811 | 878 | 950 | 3866 | 4733 | 6711 | 8588 | 10389 | 12586 |
| 41584 | 48922 | 57035 | 66006 | 75896 | 86799 | 98821 | 108929 | 119186 | 128376 | 132961 | 136051 | 137043 |
| 0 | 0 | 0 | 0 | 0 | 0 | 0 | 3063 | 3892 | 5825 | 7672 | 9667 | 11853 |
| 0 | 0 | 0 | 0 | 0 | 0 | 0 | 20836 | 43425 | 73101 | 104265 | 131382 | 161095 |
| 0 | 0 | 0 | 0 | 0 | 0 | 0 | 0 | 0 | 0 | 0 | 0 | 0 |
| 111115 | 111115 | 111115 | 111115 | 111115 | 111115 | 111115 | 111115 | 111115 | 111115 | 111115 | 111115 | 111115 |
| 41361 | 48736 | 56887 | 65895 | 75821 | 86761 | 98821 | 108929 | 119186 | 128376 | 132961 | 136051 | 137043 |
| 152476 | 159852 | 168002 | 177010 | 186936 | 197877 | 209936 | 220045 | 230301 | 239491 | 244076 | 203330 | 199899 |
| 41361 | 48736 | 56887 | 65895 | 75821 | 86761 | 98821 | 88094 | 75761 | 55275 | 28696 | 4669 | -24052 |
| 4.17% | 4.36% | 4.52% | 4.65% | 4.77% | 4.88% | 4.97% | 5.05% | 5.11% | 5.14% | 5.32% | 5.47% | 5.58% |

FIG. 12B

| | 22<br>2025<br>After | 23<br>2026<br>After | 24<br>2027<br>After | 25<br>2028<br>After | 26<br>2029<br>After | 27<br>2030<br>After | 28<br>2031<br>After | 29<br>2032<br>After | 30<br>2033<br>After | 31<br>2034<br>After | 32<br>2035<br>After | 33<br>2036<br>After | 34<br>2037<br>After |
|---|---|---|---|---|---|---|---|---|---|---|---|---|---|
| | 137043 | 138140 | 139323 | 140589 | 141928 | 143344 | 144847 | 146445 | 148152 | 149959 | 151870 | 153893 | 156036 |
| | 0 | 0 | 0 | 0 | 0 | 0 | 0 | 0 | 0 | 0 | 0 | 0 | 0 |
| | 13686 | 14099 | 14653 | 15230 | 15832 | 16461 | 17118 | 17806 | 18523 | 19272 | 20054 | 20870 | 21723 |
| | 13686 | 14099 | 14653 | 15230 | 15832 | 16461 | 17118 | 17806 | 18523 | 19272 | 20054 | 20870 | 21723 |
| | 737 | 735 | 729 | 741 | 753 | 763 | 770 | 774 | 794 | 818 | 843 | 868 | 893 |
| | 11853 | 3442 | 0 | 0 | 0 | 0 | 0 | 0 | 0 | 0 | 0 | 0 | 0 |
| | 12590 | 4178 | 729 | 741 | 753 | 763 | 770 | 774 | 794 | 818 | 843 | 868 | 893 |
| | 138140 | 139323 | 140589 | 141928 | 143344 | 144847 | 146445 | 148152 | 149959 | 151870 | 153893 | 156036 | 158311 |
| | 11853 | 11853 | 11853 | 11853 | 11853 | 11853 | 11853 | 11853 | 11853 | 11853 | 11853 | 11853 | 11853 |
| | 158908 | 156589 | 154131 | 151525 | 148763 | 145836 | 142733 | 139443 | 135957 | 132261 | 128343 | 124190 | 119788 |
| | 0 | 8739 | 21396 | 34546 | 48208 | 62404 | 77153 | 92478 | 108400 | 124944 | 142132 | 159991 | 178546 |
| | 57284 | 51664 | 45976 | 43302 | 40591 | 37843 | 35053 | 32218 | 30964 | 29692 | 28400 | 27085 | 25746 |
| | 138140 | 139323 | 140589 | 141928 | 143344 | 144847 | 146445 | 148152 | 149959 | 151870 | 153893 | 156036 | 158311 |
| | 195424 | 190987 | 186566 | 185230 | 183936 | 182689 | 181498 | 180370 | 180923 | 181562 | 182292 | 183121 | 184056 |
| | -20767 | -17266 | -13541 | -9597 | -5419 | -989 | 3713 | 8709 | 14003 | 19609 | 25549 | 31845 | 38522 |
| | 5.65% | 5.51% | 5.30% | 5.11% | 4.94% | 4.78% | 4.64% | 4.50% | 4.38% | 4.27% | 4.16% | 4.07% | 3.98% |

FIG. 12C

| 35 2038 After | 36 2039 After | 37 2040 After | 38 2041 After | 39 2042 After | 40 2043 After | 41 2044 After | 42 2045 After | 43 2046 After | 44 2047 After | 45 2048 After | 46 2049 After | 47 2050 After |
|---|---|---|---|---|---|---|---|---|---|---|---|---|
| 158311 | 160768 | 163435 | 166344 | 169534 | 173051 | 176817 | 180845 | 185156 | 189772 | 194712 | 200000 | 205651 |
| 0 | 0 | 0 | 0 | 0 | 0 | 0 | 0 | 0 | 0 | 0 | 0 | 0 |
| 22618 | 23560 | 24552 | 25599 | 26707 | 27870 | 29089 | 30369 | 31711 | 33121 | 34600 | 36153 | 37784 |
| 22618 | 23560 | 24552 | 25599 | 26707 | 27870 | 29089 | 30369 | 31711 | 33121 | 34600 | 36153 | 37784 |
| 882 | 862 | 831 | 786 | 723 | 761 | 807 | 858 | 914 | 977 | 1048 | 1136 | 1228 |
| 0 | 0 | 0 | 0 | 0 | 0 | 0 | 0 | 0 | 0 | 0 | 0 | 0 |
| 882 | 862 | 831 | 786 | 723 | 761 | 807 | 858 | 914 | 977 | 1048 | 1136 | 1228 |
| 160768 | 163435 | 166344 | 169534 | 173051 | 176817 | 180845 | 185156 | 189772 | 194712 | 200000 | 205651 | 211695 |
| 11853 | 11853 | 11853 | 11853 | 11853 | 11853 | 11853 | 11853 | 11853 | 11853 | 11853 | 11853 | 11853 |
| 115122 | 110176 | 104934 | 99376 | 93486 | 87241 | 80623 | 73607 | 66170 | 58287 | 49930 | 41073 | 31684 |
| 197825 | 217856 | 238668 | 260291 | 282758 | 306101 | 330355 | 355554 | 381736 | 408940 | 437204 | 466571 | 497082 |
| 22638 | 19453 | 16180 | 12808 | 9324 | 9518 | 9725 | 9946 | 10184 | 10437 | 10709 | 11000 | 11311 |
| 160768 | 163435 | 166344 | 169534 | 173051 | 176817 | 180845 | 185156 | 189772 | 194712 | 200000 | 205651 | 211695 |
| 183407 | 182888 | 182524 | 182342 | 182376 | 186334 | 190570 | 195103 | 199955 | 205150 | 210709 | 216651 | 223006 |
| 45646 | 53259 | 61410 | 70158 | 79566 | 89575 | 100222 | 111550 | 123602 | 136426 | 150070 | 164578 | 180011 |
| 3.89% | 3.82% | 3.75% | 3.69% | 3.63% | 3.58% | 3.54% | 3.50% | 3.46% | 3.42% | 3.39% | 3.37% | 3.35% |

FIG. 12D

| 48 2051 After | 49 2052 After | 50 2053 After | 51 2054 After | 52 2055 After | 53 2056 After | 54 2057 After | 55 2058 After | 56 2059 After | 57 2060 After | 58 2061 After | 59 2062 After | 60 2063 After |
|---|---|---|---|---|---|---|---|---|---|---|---|---|
| 211695 | 218159 | 225069 | 232453 | 253482 | 276392 | 301259 | 328184 | 357895 | 390857 | 427906 | 469624 | 516648 |
| 0 | 0 | 0 | 0 | 0 | 0 | 0 | 0 | 0 | 0 | 0 | 0 | 0 |
| 39496 | 41295 | 43184 | 46053 | 49140 | 52452 | 56001 | 59861 | 64078 | 68738 | 73898 | 79625 | 85882 |
| 39496 | 41295 | 43184 | 46053 | 49140 | 52452 | 56001 | 59861 | 64078 | 68738 | 73898 | 79625 | 85882 |
| 1331 | 1447 | 1578 | 1782 | 2081 | 2495 | 3008 | 3064 | 2975 | 2450 | 1801 | 1036 | 1128 |
| 0 | 0 | 0 | 0 | 0 | 0 | 0 | 0 | 0 | 0 | 0 | 0 | 0 |
| 1331 | 1447 | 1578 | 1782 | 2081 | 2495 | 3008 | 3064 | 2975 | 2450 | 1801 | 1036 | 1128 |
| 218159 | 225069 | 232453 | 253482 | 276392 | 301259 | 328184 | 357895 | 390857 | 427906 | 469624 | 516648 | 568607 |
| 11853 | 11853 | 11853 | 0 | 0 | 0 | 0 | 0 | 0 | 0 | 0 | 0 | 0 |
| 21732 | 11182 | 0 | 0 | 0 | 0 | 0 | 0 | 0 | 0 | 0 | 0 | 0 |
| 528784 | 561722 | 595945 | 619187 | 643335 | 668425 | 694494 | 721579 | 749721 | 778960 | 809339 | 840904 | 873699 |
| 11643 | 11999 | 12379 | 12785 | 13941 | 15202 | 16569 | 14440 | 11811 | 8599 | 4707 | 0 | 0 |
| 218159 | 225069 | 232453 | 253482 | 276392 | 301259 | 328184 | 357895 | 390857 | 427906 | 469624 | 516648 | 568607 |
| 229802 | 237068 | 244831 | 266267 | 290334 | 316461 | 344753 | 372335 | 402667 | 436505 | 474331 | 516648 | 568607 |
| 196427 | 213887 | 232453 | 253482 | 276392 | 301259 | 328184 | 357895 | 390857 | 427906 | 469624 | 516648 | 568607 |
| 3.33% | 3.31% | 3.30% | 3.37% | 3.45% | 3.52% | 3.59% | 3.67% | 3.74% | 3.82% | 3.90% | 3.98% | 4.07% |

FIG. 12E

| 61 2064 After | 62 2065 After | 63 2066 After | 64 2067 After | 65 2068 After | 66 2069 After | 67 2070 After |
|---|---|---|---|---|---|---|
| 568607 | 626027 | 689491 | 759644 | 837202 | 922957 | 1017784 |
| 0 | 0 | 0 | 0 | 0 | 0 | 0 |
| 92723 | 100208 | 108403 | 117379 | 127218 | 138009 | 149849 |
| 92723 | 100208 | 108403 | 117379 | 127218 | 138009 | 149849 |
| 1229 | 1341 | 1465 | 1603 | 1755 | 1923 | 2110 |
| 0 | 0 | 0 | 0 | 0 | 0 | 0 |
| 1229 | 1341 | 1465 | 1603 | 1755 | 1923 | 2110 |
| 626027 | 689491 | 759644 | 837202 | 922957 | 1017784 | 1122657 |
| 0 | 0 | 0 | 0 | 0 | 0 | 0 |
| 9077773 | 943176 | 979960 | 1018179 | 1057888 | 1099145 | 1142012 |
| 0 | 0 | 0 | 0 | 0 | 0 | 0 |
| 626027 | 689491 | 759644 | 837202 | 922957 | 1017784 | 1122657 |
| 626027 | 689491 | 759644 | 837202 | 922957 | 1017784 | 1122657 |
| 4.15% | 4.23% | 4.31% | 4.39% | 4.47% | 4.54% | 4.62% |

| | WISE | WISE (NEED) | 529 (RISK-BASED) | 529 |
|---|---|---|---|---|
| Income Limitations | None | None | None | None |
| Contribution Limits | No | No | $11,000 per year gift tax free* | $11,000 per year gift tax free* |
| Control | Owner | Owner | Owner | Owner |
| Income Tax Treatment | Tax free or deferred | Tax free or deferred | Tax free or Deferred | Tax free or Deferred |
| Federal Financial Aid Impact | 0% of assets | 0% of assets | 5.6% of assets | 5.6% of assets |
| Investment Flexibility | Almost Unlimited | Almost Unlimited | Limited | Limited |
| Uses | Diverse | Diverse | Higher Education | Higher Education |
| Withdrawal Penalties | Minimal | Minimal | Income tax and 10% for non-education | Income tax and 10% for non-education |
| Beneficiary Changes | Yes | Yes | Yes | Yes |
| Savings needed per month | $266 | $331 | $238 | $334 |
| Annual Savings | $3,182 | $3,969 | $2,856 | $4,010 |
| Number of years saved | 18 | 18 | 18 | 18 |
| Lump Sum Payments | $0 | $0 | $0 | $0 |
| Total Savings Needed | $57,267 | $71,434 | $51,405 | $72,179 |
| Addtl Cost above Wise Plan | | $14,167 | -$5,863 | $14,912 |

\* up to $55,000 in a 5 year span
\*\* early withdrawals are any taken before the age of 59.5

*Fig. 13A*

| | COVERDELL | UGMA | TAXABLE | TAXABLE (PLUS) | ROTH | ROTH (PLUS) |
|---|---|---|---|---|---|---|
| | Single = $110,000 Married = $220,000 | None | None | None | Single = $95,000 Married = $150,000 | Single = $95,000 Married = $150,000 |
| | $2,000 per year | $11,000 per year gift tax free* | No | No | $3,000 per year | $3,000 per year |
| | Owner | Beneficiary at age 18 or 21 | Owner | Owner | Owner | Owner |
| | Tax free or Deferred | Parent's Tax Rate under age 14 | Fully Taxed | Fully Taxed | Tax free or Deferred | Tax free or Deferred |
| | 5.6% of assets | 35% of assets | 5.6% of assets | 5.6% of assets | 0% of assets | 0% of assets |
| | Almost Unlimited | Moves create taxable event | Moves create taxable event | Moves create taxable event | Unlimited | Unlimited |
| | Education | Diverse | Diverse | Diverse | Diverse | Diverse |
| | Income tax and 10% for non-education | No | No | No | 10% for non-education early withdrawals** | 10% for non-education early withdrawals** |
| | Yes | No | Yes | Yes | Yes | Yes |
| | $327 | $372 | $421 | $314 | $332 | $165 |
| | $3,929 | $4,465 | $5,049 | $3,768 | $3,981 | $1,983 |
| | 18 | 18 | 18 | 18 | 18 | 18 |
| | $0 | $0 | $0 | $0 | $0 | $0 |
| | $70,729 | $80,368 | $90,880 | $67,815 | $71,650 | $35,694 |
| | $13,462 | $23,101 | $33,613 | $10,548 | $14,383 | -$21,574 |

CONTINUED FROM FIG. 13A

*Fig. 13B*

Son

| Harvard U | | 2004 | 2019 | 2020 | 2021 | 2022 | TOTAL |
|---|---|---|---|---|---|---|---|
| Cost of Attendance | | $41,506.92 | $73,283.78 | $76,132.03 | $79,081.03 | $82,145.10 | $310,851.93 |
| Expected Family Contribution (actual calculated EFC) | | $7,273.60 | $21,679.19 | $22,887.41 | $13,194.34 | $13,852.59 | $71,613.53 |
| Financial Need | | $34,233.32 | $51,614.57 | $53,244.62 | $65,886.70 | $68,292.51 | $239,038.40 |
| Unmet Need | 0% | $0.00 | $0.00 | $0.00 | $0.00 | $0.00 | $0.00 |
| Financial Aid Offered (Need Met) | 100% | | | | | | |
| Grants and Scholarships | 83% | $28,413.66 | $42,840.10 | $44,193.04 | $54,685.96 | $56,682.78 | $198,401.87 |
| Student Loans and Work Study | 17% | $5,819.66 | $8,774.48 | $9,051.59 | $11,200.74 | $11,609.73 | $40,636.53 |
| Total Out of Pocket Expense | 100% | $7,273.60 | $21,679.19 | $22,887.41 | $13,194.34 | $13,852.59 | $71,613.53 |
| Amount you are saving to cover | | $7,273.60 | $21,679.19 | $22,887.41 | $13,194.34 | $13,852.59 | $71,613.53 |
| Amounts at today value (PV) | | | $13,915.05 | $14,262.68 | $7,982.79 | $8,136.94 | $44,297.45 |

Daughter

| Penn State Park | | 2004 | 2021 | 2022 | 2023 | 2024 | TOTAL |
|---|---|---|---|---|---|---|---|
| Cost of Attendance | | $17,313.31 | $31,954.29 | $33,133.30 | $34,356.48 | $35,625.53 | $135,069.60 |
| Expected Family Contribution (actual calculated EFC) | | $7,273.60 | $12,326.59 | $12,958.82 | $25,813.35 | $29,124.30 | $80,223.06 |
| Financial Need | | $10,039.71 | $19,627.70 | $20,174.48 | $8,543.13 | $6,501.23 | $54,846.54 |
| Unmet Need | 22% | $2,208.74 | $4,318.09 | $4,438.39 | $1,879.49 | $1,430.27 | $12,086.24 |
| Financial Aid Offered (Need Met) | 78% | | | | | | |
| Grants and Scholarships | 44% | $3,445.63 | $6,736.23 | $6,923.88 | $2,932.00 | $2,231.22 | $18,823.33 |
| Student Loans and Work Study | 56% | $4,385.35 | $8,573.38 | $8,812.21 | $3,731.64 | $2,839.74 | $23,956.97 |
| Total Out of Pocket Expense | 100% | $9,482.34 | $16,664.69 | $17,397.20 | $27,692.84 | $30,554.57 | $92,289.30 |
| Amount you are saving to cover | | $9,482.34 | $16,664.69 | $17,397.20 | $27,692.84 | $30,554.57 | $92,289.30 |
| Amounts at today value (PV) | | | $10,070.31 | $10,219.02 | $15,792.84 | $16,917.32 | $52,999.50 |

*Fig. 15A*

| | | 2004 | | | | | TOTAL |
|---|---|---|---|---|---|---|---|
| Cost of Attendance | | #N/A | #N/A | #N/A | #N/A | #N/A | #N/A |
| Expected Family Contribution | | #N/A | #N/A | #N/A | #N/A | #N/A | #N/A |
| (actual calculated EFC) | | #N/A | #N/A | #N/A | #N/A | #N/A | #N/A |
| Financial Need | | #N/A | #N/A | #N/A | #N/A | #N/A | #N/A |
| Unmet Need | #N/A | #N/A | #N/A | #N/A | #N/A | #N/A | #N/A |
| Financial Aid Offered (Need Met) | #N/A | | | | | | |
| Grants and Scholarships | #N/A | #N/A | #N/A | #N/A | #N/A | #N/A | #N/A |
| Student Loans and Work Study | #N/A | #N/A | #N/A | #N/A | #N/A | #N/A | #N/A |
| Total Out of Pocket Expense | | #N/A | #N/A | #N/A | #N/A | #N/A | #N/A |
| Amount you are saving to cover | 0% | #N/A | #N/A | #N/A | #N/A | #N/A | #N/A |
| Amounts at today value (PV) | | #VALUE! | #VALUE! | #VALUE! | #VALUE! | #VALUE! | #VALUE! |

| | | 2004 | | | | | TOTAL |
|---|---|---|---|---|---|---|---|
| Cost of Attendance | | #N/A | #N/A | #N/A | #N/A | #N/A | #N/A |
| Expected Family Contribution | | #N/A | #N/A | #N/A | #N/A | #N/A | #N/A |
| (actual calculated EFC) | | #N/A | #N/A | #N/A | #N/A | #N/A | #N/A |
| Financial Need | | #N/A | #N/A | #N/A | #N/A | #N/A | #N/A |
| Unmet Need | #N/A | #N/A | #N/A | #N/A | #N/A | #N/A | #N/A |
| Financial Aid Offered (Need Met) | #N/A | | | | | | |
| Grants and Scholarships | #N/A | #N/A | #N/A | #N/A | #N/A | #N/A | #N/A |
| Student Loans and Work Study | #N/A | #N/A | #N/A | #N/A | #N/A | #N/A | #N/A |
| Total Out of Pocket Expense | | #N/A | #N/A | #N/A | #N/A | #N/A | #N/A |
| Amount you are saving to cover | 0% | #N/A | #N/A | #N/A | #N/A | #N/A | #N/A |
| Amounts at today value (PV) | | #VALUE! | #VALUE! | #VALUE! | #VALUE! | #VALUE! | #VALUE! |

*Fig. 15B*

|  | | Wise Cash | Wise Loans | Wise Equity | Total Contributed |
|---|---|---|---|---|---|
| Balance before college | 2018 | $98,821 | $0 | $98,821 | $57,267 |
| Balance at graduation | 2025 | $138,140 | $158,908 | $0 | |
| Balance at end of plan | 2045 | $185,156 | $73,607 | $111,550 | |

|  | | Wise Cash | Wise Loans | Wise Equity | 529 | Total Contributed |
|---|---|---|---|---|---|---|
| Balance before college | 2018 | $128,129 | $0 | $128,129 | $126,252 | $79,179 |
| Balance at graduation | 2025 | $221,409 | $158,908 | $65,501 | $0 | |
| Balance at end of plan | 2045 | $807,652 | $73,607 | $734,046 | #N/A | |

|  | | Wise Cash | Wise Loans | Wise Equity | Coverdell | Total Contributed |
|---|---|---|---|---|---|---|
| Balance before college | 2018 | $125,277 | $0 | $125,277 | $117,699 | $70,729 |
| Balance at graduation | 2025 | $215,051 | $158,908 | $56,144 | $0 | |
| Balance at end of plan | 2045 | $760,323 | $73,607 | $686,716 | $0 | |

|  | | Wise Cash | Wise Loans | Wise Equity | UGMA | Total Contributed |
|---|---|---|---|---|---|---|
| Balance before college | 2018 | $144,240 | $0 | $144,240 | $126,955 | $80,368 |
| Balance at graduation | 2025 | $257,316 | $158,908 | $98,409 | $0 | |
| Balance at end of plan | 2045 | $1,074,913 | $73,607 | $1,001,307 | $0 | |

|  | | Wise Cash | Wise Loans | Wise Equity | Roth | Total Contributed |
|---|---|---|---|---|---|---|
| Balance before college | 2018 | $127,089 | $0 | $127,089 | $125,250 | $71,650 |
| Balance at graduation | 2025 | $219,091 | $158,908 | $60,183 | $0 | |
| Balance at end of plan | 2045 | $790,395 | $73,607 | $716,788 | $0 | |

|  | | Wise Cash | Wise Loans | Wise Equity | Taxable | Total Contributed |
|---|---|---|---|---|---|---|
| Balance before college | 2018 | $164,949 | $0 | $164,949 | $128,054 | $90,880 |
| Balance at graduation | 2025 | $303,467 | $158,908 | $144,560 | $0 | |
| Balance at end of plan | 2045 | $1,418,106 | $73,607 | $1,344,499 | $0 | |

*Fig. 18A*

|  | Loan Schedule | From Savings | Withdrawal from VUL | VUL Loan |
|---|---|---|---|---|
| 2019 | $3,063 | $3,063 | $0 | $0 |
| 2020 | $3,892 | $3,182 | $710 | $0 |
| 2021 | $5,825 | $3,182 | $2,643 | $0 |
| 2022 | $7,672 | $0 | $7,672 | $0 |
| 2023 | $9,667 | $0 | $9,667 | $0 |
| 2024 | $11,853 | $0 | $11,853 | $0 |
| 2025 | $11,853 | $0 | $11,853 | $0 |
| 2026 | $11,853 | $0 | $3,442 | $8,411 |
| 2027 | $11,853 | $0 | $0 | $11,853 |
| 2028 | $11,853 | $0 | $0 | $11,853 |
| 2029 | $11,853 | $0 | $0 | $11,853 |
| 2030 | $11,853 | $0 | $0 | $11,853 |
| 2031 | $11,853 | $0 | $0 | $11,853 |
| 2032 | $11,853 | $0 | $0 | $11,853 |
| 2033 | $11,853 | $0 | $0 | $11,853 |
| 2034 | $11,853 | $0 | $0 | $11,853 |
| 2035 | $11,853 | $0 | $0 | $11,853 |
| 2036 | $11,853 | $0 | $0 | $11,853 |
| 2037 | $11,853 | $0 | $0 | $11,853 |
| 2038 | $11,853 | $0 | $0 | $11,853 |
| 2039 | $11,853 | $0 | $0 | $11,853 |
| 2040 | $11,853 | $0 | $0 | $11,853 |
| 2041 | $11,853 | $0 | $0 | $11,853 |
| 2042 | $11,853 | $0 | $0 | $11,853 |
| 2043 | $11,853 | $0 | $0 | $11,853 |
| 2044 | $11,853 | $0 | $0 | $11,853 |
| 2045 | $11,853 | $0 | $0 | $11,853 |
| 2046 | $11,853 | $0 | $0 | $11,853 |
| 2047 | $11,853 | $0 | $0 | $11,853 |
| 2048 | $11,853 | $0 | $0 | $11,853 |
| 2049 | $11,853 | $0 | $0 | $11,853 |
| 2050 | $11,853 | $0 | $0 | $11,853 |
| 2051 | $11,853 | $0 | $0 | $11,853 |
| 2052 | $11,853 | $0 | $0 | $11,853 |
| 2053 | $11,853 | $0 | $0 | $11,853 |
| 2054 | $0 | $0 | $0 | $0 |

(Table continued on FIG. 20B)

FIG. 20A (Table continued from FIG. 20A)

| | | | | |
|---|---|---|---|---|
| 2055 | $0 | $0 | $0 | $0 |
| 2056 | $0 | $0 | $0 | $0 |
| 2057 | $0 | $0 | $0 | $0 |
| 2058 | $0 | $0 | $0 | $0 |
| 2059 | $0 | $0 | $0 | $0 |
| 2060 | $0 | $0 | $0 | $0 |
| 2061 | $0 | $0 | $0 | $0 |
| 2062 | $0 | $0 | $0 | $0 |
| 2063 | $0 | $0 | $0 | $0 |
| 2064 | $0 | $0 | $0 | $0 |
| 2065 | $0 | $0 | $0 | $0 |
| 2066 | $0 | $0 | $0 | $0 |
| 2067 | $0 | $0 | $0 | $0 |
| 2068 | $0 | $0 | $0 | $0 |
| 2069 | $0 | $0 | $0 | $0 |
| 2070 | $0 | $0 | $0 | $0 |
| 2071 | $0 | $0 | $0 | $0 |
| 2072 | $0 | $0 | $0 | $0 |
| 2073 | $0 | $0 | $0 | $0 |
| 2074 | $0 | $0 | $0 | $0 |
| 2075 | $0 | $0 | $0 | $0 |
| 2076 | $0 | $0 | $0 | $0 |
| 2077 | $0 | $0 | $0 | $0 |
| 2078 | $0 | $0 | $0 | $0 |
| 2079 | $0 | $0 | $0 | $0 |
| 2080 | $0 | $0 | $0 | $0 |
| 2081 | $0 | $0 | $0 | $0 |
| 2082 | $0 | $0 | $0 | $0 |
| 2083 | $0 | $0 | $0 | $0 |
| 2084 | $0 | $0 | $0 | $0 |
| 2085 | $0 | $0 | $0 | $0 |
| 2086 | $0 | $0 | $0 | $0 |
| 2087 | $0 | $0 | $0 | $0 |
| 2088 | $0 | $0 | $0 | $0 |
| 2089 | $0 | $0 | $0 | $0 |
| 2090 | $0 | $0 | $0 | $0 |
| 2091 | $0 | $0 | $0 | $0 |
| 2092 | $0 | $0 | $0 | $0 |

FIG. 20B

| Plan Year | 1 | 2 | 3 | 4 | 5 | 6 | 7 | 8 | 9 | 10 | 11 |
|---|---|---|---|---|---|---|---|---|---|---|---|
| Year | 2004 | 2005 | 2006 | 2007 | 2008 | 2009 | 2010 | 2011 | 2012 | 2013 | 2014 |
| Premium | 3182 | 3182 | 3182 | 3182 | 3182 | 3182 | 3182 | 3182 | 3182 | 3182 | 3182 |
| Charges | | | | | | | | | | | |
| Premium Load | 127 | 127 | 127 | 127 | 127 | 127 | 127 | 127 | 127 | 127 | 127 |
| Admin | 120 | 60 | 60 | 60 | 60 | 60 | 60 | 60 | 60 | 60 | 60 |
| Asset Charge | 18 | 36 | 56 | 79 | 103 | 130 | 155 | 171 | 189 | 209 | 231 |
| Rider | 0 | 0 | 0 | 0 | 0 | 0 | 0 | 0 | 0 | 0 | 0 |
| COI | 217 | 230 | 241 | 251 | 259 | 266 | 273 | 280 | 288 | 294 | 301 |
| Total Fees | 483 | 454 | 485 | 517 | 550 | 583 | 615 | 638 | 664 | 690 | 719 |
| Contract Value | 2996 | 6353 | 10045 | 14107 | 18580 | 23507 | 28941 | 34946 | 41584 | 48922 | 57035 |
| Fees % of Value | 16.11% | 7.14% | 4.83% | 3.67% | 2.96% | 2.48% | 2.13% | 1.83% | 1.60% | 1.41% | 1.26% |

FIG. 21A

| | 12 | 13 | 14 | 15 | 16 | 17 | 18 | 19 | 20 | 21 | 22 | 23 | 24 |
|---|---|---|---|---|---|---|---|---|---|---|---|---|---|
| | 2015 | 2016 | 2017 | 2018 | 2019 | 2020 | 2021 | 2022 | 2023 | 2024 | 2025 | 2026 | 2027 |
| | 3182 | 3182 | 3182 | 3182 | 118 | 0 | 0 | 0 | 0 | 0 | 0 | 0 | 0 |
| | 127 | 127 | 127 | 127 | 5 | 0 | 0 | 0 | 0 | 0 | 0 | 0 | 0 |
| | 60 | 60 | 60 | 60 | 60 | 60 | 60 | 60 | 60 | 60 | 60 | 60 | 60 |
| | 255 | 282 | 312 | 345 | 298 | 316 | 333 | 341 | 347 | 348 | 350 | 352 | 353 |
| | 0 | 0 | 0 | 0 | 0 | 0 | 0 | 0 | 0 | 0 | 0 | 0 | 0 |
| | 308 | 342 | 379 | 418 | 440 | 465 | 493 | 515 | 316 | 324 | 326 | 323 | 316 |
| | 750 | 811 | 878 | 950 | 802 | 842 | 886 | 917 | 722 | 732 | 737 | 735 | 729 |
| | 66006 | 75896 | 86799 | 98821 | 108929 | 119186 | 128376 | 132961 | 136051 | 137043 | 138140 | 139323 | 140589 |
| | 1.14% | 1.07% | 1.01% | 0.96% | 0.74% | 0.71% | 0.69% | 0.69% | 0.53% | 0.53% | 0.53% | 0.53% | 0.52% |

FIG. 21B

| 25 | 26 | 27 | 28 | 29 | 30 | 31 | 32 | 33 | 34 | 35 | 36 | 37 |
|---|---|---|---|---|---|---|---|---|---|---|---|---|
| 2028 | 2029 | 2030 | 2031 | 2032 | 2033 | 2034 | 2035 | 2036 | 2037 | 2038 | 2039 | 2040 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 60 | 60 | 60 | 60 | 60 | 60 | 60 | 60 | 60 | 60 | 60 | 60 | 60 |
| 355 | 357 | 358 | 360 | 362 | 364 | 367 | 369 | 372 | 375 | 378 | 381 | 385 |
| 0 | 0 | 0 | 0 | 0 | 0 | 0 | 0 | 0 | 0 | 0 | 0 | 0 |
| 326 | 337 | 345 | 350 | 352 | 370 | 391 | 414 | 436 | 458 | 444 | 421 | 386 |
| 741 | 753 | 763 | 770 | 774 | 794 | 818 | 843 | 868 | 893 | 882 | 862 | 831 |
| 141928 | 143344 | 144847 | 146445 | 148152 | 149959 | 151870 | 153893 | 156036 | 158311 | 160768 | 163435 | 166344 |
| 0.52% | 0.53% | 0.53% | 0.53% | 0.52% | 0.53% | 0.54% | 0.55% | 0.56% | 0.56% | 0.55% | 0.53% | 0.50% |

FIG. 21C

| 38 | 39 | 40 | 41 | 42 | 43 | 44 | 45 | 46 | 47 | 48 | 49 | 50 |
|---|---|---|---|---|---|---|---|---|---|---|---|---|
| 2041 | 2042 | 2043 | 2044 | 2045 | 2046 | 2047 | 2048 | 2049 | 2050 | 2051 | 2052 | 2053 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 60 | 60 | 60 | 60 | 60 | 60 | 60 | 60 | 60 | 60 | 60 | 60 | 60 |
| 389 | 394 | 399 | 405 | 411 | 418 | 425 | 433 | 441 | 450 | 460 | 470 | 482 |
| 0 | 0 | 0 | 0 | 0 | 0 | 0 | 0 | 0 | 0 | 0 | 0 | 0 |
| 336 | 269 | 302 | 342 | 386 | 436 | 492 | 555 | 634 | 718 | 811 | 916 | 1036 |
| 786 | 723 | 761 | 807 | 858 | 914 | 977 | 1048 | 1136 | 1228 | 1331 | 1447 | 1578 |
| 169534 | 173051 | 176817 | 180845 | 185156 | 189772 | 194712 | 200000 | 205651 | 211695 | 218159 | 225069 | 232453 |
| 0.46% | 0.42% | 0.43% | 0.45% | 0.46% | 0.48% | 0.50% | 0.52% | 0.55% | 0.58% | 0.61% | 0.64% | 0.68% |

FIG. 21D

| 51 | 52 | 53 | 54 | 55 | 56 | 57 | 58 | 59 | 60 | 61 | 62 | 63 |
|---|---|---|---|---|---|---|---|---|---|---|---|---|
| 2054 | 2055 | 2056 | 2057 | 2058 | 2059 | 2060 | 2061 | 2062 | 2063 | 2064 | 2065 | 2066 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 60 | 60 | 60 | 60 | 60 | 60 | 60 | 60 | 60 | 60 | 60 | 60 | 60 |
| 518 | 559 | 603 | 650 | 702 | 760 | 823 | 895 | 976 | 1068 | 1169 | 1281 | 1405 |
| 0 | 0 | 0 | 0 | 0 | 0 | 0 | 0 | 0 | 0 | 0 | 0 | 0 |
| 1204 | 1462 | 1832 | 2298 | 2302 | 2155 | 1566 | 846 | 0 | 0 | 0 | 0 | 0 |
| 1782 | 2081 | 2495 | 3008 | 3064 | 2975 | 2450 | 1801 | 1036 | 1128 | 1229 | 1341 | 1465 |
| 253482 | 276392 | 301259 | 328184 | 357895 | 390857 | 427906 | 469624 | 516648 | 568607 | 626027 | 689491 | 759644 |
| 0.70% | 0.75% | 0.83% | 0.92% | 0.86% | 0.76% | 0.57% | 0.38% | 0.20% | 0.20% | 0.20% | 0.19% | 0.19% |

FIG. 21E

| 64 | 65 | 66 | 67 | 68 | 69 | 70 |
|---|---|---|---|---|---|---|
| 2067 | 2068 | 2069 | 2070 | 2071 | 2072 | 2073 |
| 0 | 0 | 0 | 0 | 0 | 0 | 0 |
| 0 | 0 | 0 | 0 | 0 | 0 | 0 |
| 60 | 60 | 60 | 60 | 60 | 60 | 60 |
| 1543 | 1695 | 1863 | 2050 | 2256 | 2485 | 2738 |
| 0 | 0 | 0 | 0 | 0 | 0 | 0 |
| 0 | 0 | 0 | 0 | 0 | 0 | 0 |
| 1603 | 1755 | 1923 | 2110 | 2316 | 2545 | 2798 |
| 837202 | 922957 | 1017784 | 1122657 | 1238649 | 1366953 | 1508887 |
| 0.19% | 0.19% | 0.19% | 0.19% | 0.19% | 0.19% | 0.19% |

FIG. 21F

| 71 | 72 | 73 | 74 | 75 | 76 | 77 | 78 | 79 | 80 |
|---|---|---|---|---|---|---|---|---|---|
| 2074 | 2075 | 2076 | 2077 | 2078 | 2079 | 2080 | 2081 | 2082 | 2083 |
| 0 | 0 | 0 | 0 | 0 | 0 | 0 | 0 | 0 | 0 |
| 0 | 0 | 0 | 0 | 0 | 0 | 0 | 0 | 0 | 0 |
| 60 | 60 | 60 | 60 | 60 | 60 | 60 | 60 | 60 | 60 |
| 3018 | 3328 | 3671 | 4052 | 4473 | 4939 | 5455 | 6027 | 6660 | 7362 |
| 0 | 0 | 0 | 0 | 0 | 0 | 0 | 0 | 0 | 0 |
| 0 | 0 | 0 | 0 | 0 | 0 | 0 | 0 | 0 | 0 |
| 3078 | 3388 | 3731 | 4112 | 4533 | 4999 | 5515 | 6087 | 6720 | 7422 |
| 1665914 | 1839650 | 2031889 | 2244615 | 2480028 | 2740562 | 3028916 | 3348076 | 3701352 | 4092410 |
| 0.18% | 0.18% | 0.18% | 0.18% | 0.18% | 0.18% | 0.18% | 0.18% | 0.18% | 0.18% |

FIG. 21G

PROCESS FOR CREATING A FINANCIAL PLAN FOR FUNDING OF COLLEGE EDUCATION

CROSS-REFERENCE TO RELATED APPLICATIONS

This application is a continuation-in-part of copending U.S. application Ser. No. 10/159,182 filed May 31, 2002.

This application claims the benefit of U.S. Provisional Application No. 60/354,373 filed Feb. 5, 2002.

COMPACT DISC APPENDIX

This patent application includes 45 Appendices on one compact disc having 45 respective file names as listed below, created on Mar. 25, 2005, and having a total combined size of 19.8 megabytes. The compact disc is incorporated by reference into the present patent application.

File Names and File Sizes:

| File Name | Size |
|---|---|
| 529 age based.txt | 334,078 bytes |
| 529 risk based.txt | 306,452 bytes |
| Allocation.txt | 12,425 bytes |
| Asset Protection.txt | 1,040 bytes |
| Bureau of Labor Statistics.txt | 908 bytes |
| College and Savings Plan Inputs.txt | 2,762 bytes |
| College Board Statistics.txt | 2,466 bytes |
| College List.txt | 9,277,298 bytes |
| College Savings calc.txt | 12,730 bytes |
| Comparison.txt | 8,135 bytes |
| Coverdell.txt | 509,566 bytes |
| Early Demise Insurance.txt | 151,245 bytes |
| EFC calculation.txt | 55,974 bytes |
| Financial aid.txt | 13,156 bytes |
| Financials.txt | 2,443 bytes |
| Income Protection.txt | 882 bytes |
| Input page.txt | 58,378 bytes |
| Insurance Ratio.txt | 1,427 bytes |
| Loan Rates with Cap.txt | 13,606 bytes |
| Loan Schedule.txt | 18,854 bytes |
| Max Funding.txt | 3,991 bytes |
| Min Death Benefit.txt | 44,659 bytes |
| Mortality table.txt | 6,425 bytes |
| Personal Inputs.txt | 2,997 bytes |
| Profile Schools.txt | 31,873 bytes |
| ROTH.txt | 527,670 bytes |
| ROTH with PLUS.txt | 718,650 bytes |
| Savings plan choices.txt | 3,239 bytes |
| State Tax Allowance.txt | 2,204 bytes |
| Taxable.txt | 294,372 bytes |
| Taxable with PLUS.txt | 668,293 bytes |
| Term Insurance.txt | 31,678 bytes |
| UGMA.txt | 299,208 bytes |
| VUL COI FEMALE.txt | 20,414 bytes |
| VUL COI MALE.txt | 24,514 bytes |
| Wise min ins TAXABLE.txt | 782,193 bytes |
| Wise min ins.txt | 798,968 bytes |
| Wise min ins UGMA.txt | 781,934 bytes |
| Wise Cash Flow.txt | 37,774 bytes |
| Wise Cost Summary.txt | 19,053 bytes |
| Wise Family need.txt | 800,521 bytes |
| Wise min ins 529 age.txt | 782,817 bytes |
| Wise min ins 529 risk.txt | 782,898 bytes |
| Wise min ins Coverdell.txt | 782,339 bytes |
| Wise min ins roth.txt | 781,934 bytes |

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Numerous financial planning methods exist which anticipate the post-secondary education of an individual. However, none utilize the interaction of federally guaranteed Parental Plus Loan and consolidation loans, along with a Variable Universal Life Insurance Policy (hereinafter referred to as "VULIP").

BRIEF SUMMARY OF THE INVENTION

One embodiment of the present invention is a financial planning method that includes the steps of: establishing at least one Variable Universal Life Insurance Policy; obtaining at least one federally guaranteed Parental Plus Loan; consolidating the at least one Parental Plus Loan into the at least one consolidation loan, the at least one consolidated loan being serviceable by the at least one Variable Universal Life Insurance Policy. The financial planning method also includes adding other finances, and the at least one Variable Universal Life Insurance Policy being usable for the other finances. In addition, the at least one Variable Universal Life Insurance Policy can be used for other finances and/or can service the at least one consolidation loan.

The present invention also includes a financial planning method including the following steps: determining the total estimated cost of education for a student; calculating the amount of annual savings needed; establishing at least one Variable Universal Life Insurance Policy on at least one life allowed by law, the at least one Variable Universal Life Insurance Policy having a savings vehicle; managing the savings vehicle to optimize the growth inside the at least one Variable Universal Life Insurance Policy; obtaining at least one federally guaranteed Parental Plus Loan; consolidating the at least one Parental Plus Loan into at least one consolidation loan, the at least one consolidation loan being serviceable with the at least one Variable Universal Life Insurance Policy.

In addition, the method includes servicing the at least one consolidation loan with the at least one Variable Universal Life Insurance Policy. Also, the at least one Parental Plus loan can be for the annual education costs not covered by other grants and scholarships received by the student.

Further, the method can include consolidating the at least one Parental Plus Loan into at least one consolidation loan for the longest period available.

The method can include establishing at least one Variable Universal Life Insurance Policy step using a no-load or a low-load insurance provider. And, the managing the savings vehicle step can include the use of tactical asset management. The savings vehicle has sub-accounts, and the method can include investing the sub-accounts to optimize the growth inside at least one Variable Universal Life Insurance Policy.

The at least one consolidation loan can be a Sallie Mae loan, and the education can be a college education. In addition, the method can include estimating 4.9 years of college education when determining the total estimated cost of education for the student.

The establishing at least one Variable Universal Life Insurance Policy step can include computing the policy face amount as the minimum amount that will not make the at least one Variable Universal Life Insurance Policy a modified endowment contract under the U.S. tax code; which can be increased by 20 percent.

The method further can include other finances and the at least one Variable Universal Life Insurance Policy can be usable and/or used for the other finances. The invention is also a financial planning method for a college education of a student, which includes the steps of determining the total estimated cost of education for the student; calculating the amount of annual savings needed; establishing at least one Variable Universal Life Insurance Policy on at least one life allowed by law, the at least one Variable Universal Life Insurance Policy having a savings vehicle having sub-accounts; investing the sub-accounts to optimize the growth inside the at least one Variable Universal Life Insurance Policy; obtaining annually, if needed, a federally guaranteed Parental Plus Loan, when the student enters college, for the annual education costs not covered by other grants and scholarships received by the student; consolidating, at the last year that a Parental Plus Loan is needed, the at least one Parental Plus Loan into at least one consolidation loan for the longest period available; and servicing the indebtedness of the at least one consolidation loan from the at least one Variable Universal Life Insurance Policy.

Another embodiment of the present invention creates a financial plan for parental funding of a student's college education. The financial plan is creates in the following manner.

1. Factors for determining the total estimated present value cost of the student's college education are inputted into a computer.
2. Factors for determining parameters of a variable life insurance policy having an equity component for the parent to be used in funding at least a portion of the student's college education are also inputting into the computer.
3. A computer program calculates from the inputted factors (a) the total estimated present value cost of the student's college education that must be funded by the parent and the student, and (b) the rate of accumulation of equity of the insurance policy necessary to fund the total estimated present value cost of the student's college education.
4. The computer program uses the rate of accumulation of equity of the insurance policy to calculate the parameters of the insurance policy that will provide for the desired rate of accumulation. The parameters include (a) a face amount, (b) term of payments, and (c) amount of monthly payment.
5. A financial plan is then created for parental funding of the student's college education. The financial plan specifies (a) the insurance policy parameters, (b) a schedule of estimated college loans to be applied for by the parent for each of the years of attendance by the student, (c) consolidation loan recommendations for consolidation of the annual college loans, including monthly debt servicing amounts for the consolidation loan, and (d) debt servicing recommendations for making withdrawals or loans against the accumulated value of the life insurance policy to pay at least some of the monthly debt servicing amounts of the consolidation loan.
6. An output of the financial plan is then provided.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. However, the invention is not limited to the precise arrangements and instrumentalities shown. In the drawings, the same reference numbers are employed for designating the same elements throughout the several figures.

In the drawings:

FIGS. 11–21G illustrate details of the embodiment in FIG. 10.

DETAILED DESCRIPTION OF THE INVENTION

Figure 1:
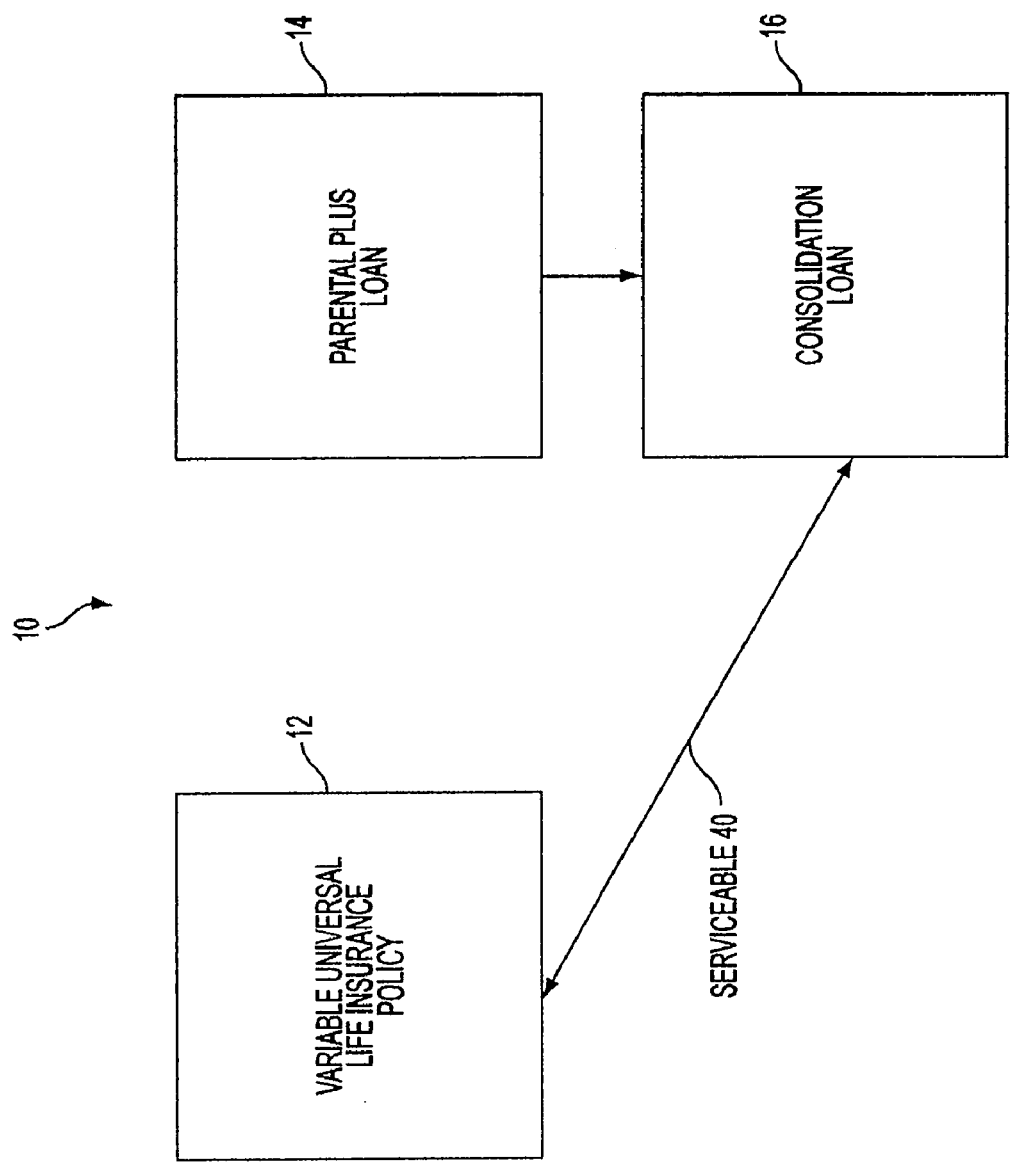
FIGS. 1–8 are flowcharts showing different preferred embodiment of the present invention.

In describing embodiments of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

The present invention is described in the context of a commercial embodiment referred to as the WISE™ Educational Savings Plan.

FIG. 1 shows a financial planning method 10 in accordance with one preferred embodiment of the present invention that involves the step 12 of establishing at least one Variable Universal Life Insurance Policy (hereinafter referred to as "VULIP"). A VULIP is an insurance device, known in the art, which provides both life insurance and a savings vehicle.

In addition, the method 10 includes the step 14 of obtaining at least one federally guaranteed Parental Plus Loan. A Parental Plus Loan is a government guaranteed 10-year credit arrangement that is available under current law to all credit-worth parents at a very attractive interest rate. A Parental Plus Loan is a loan known in the art which is obtainable for the post-secondary education of the student. In addition, as known in the art, the Parental Plus Loan only can be used for undergraduate college educations. The Parental Plus Loan may be applied for annually each year the student is enrolled in a post-secondary undergraduate educational program. Currently, a legal guardian who is not a parent is allowed to obtain a Parental Plus Loan for the student. However, if the law changes the planner may plan to have a legal guardian or any other individual or entity allowable by law obtain the Parental Plus Loan for the student. Further, as known in the art of tax advising, interest expense on the Parental Plus Loan may be wholly or partially tax deductible on the parent's tax return.

The method further includes the step 16 of consolidating the at least one Parental Plus Loan into at least one consolidation loan. As also seen in FIG. 1, the at least one consolidation loan debt is serviceable 40 with the at least one VULIP. Servicing the indebtedness of a consolidation loan may occur from withdrawals or loans, or in other manners known in the art, against the accumulated value of the at least one Variable Universal Life Insurance Policy. Servicing a debt is a term well known in the art. It includes, but is not limited to, payment, deferment of payment, transfer, leveraging, and the like.

Figure 2:
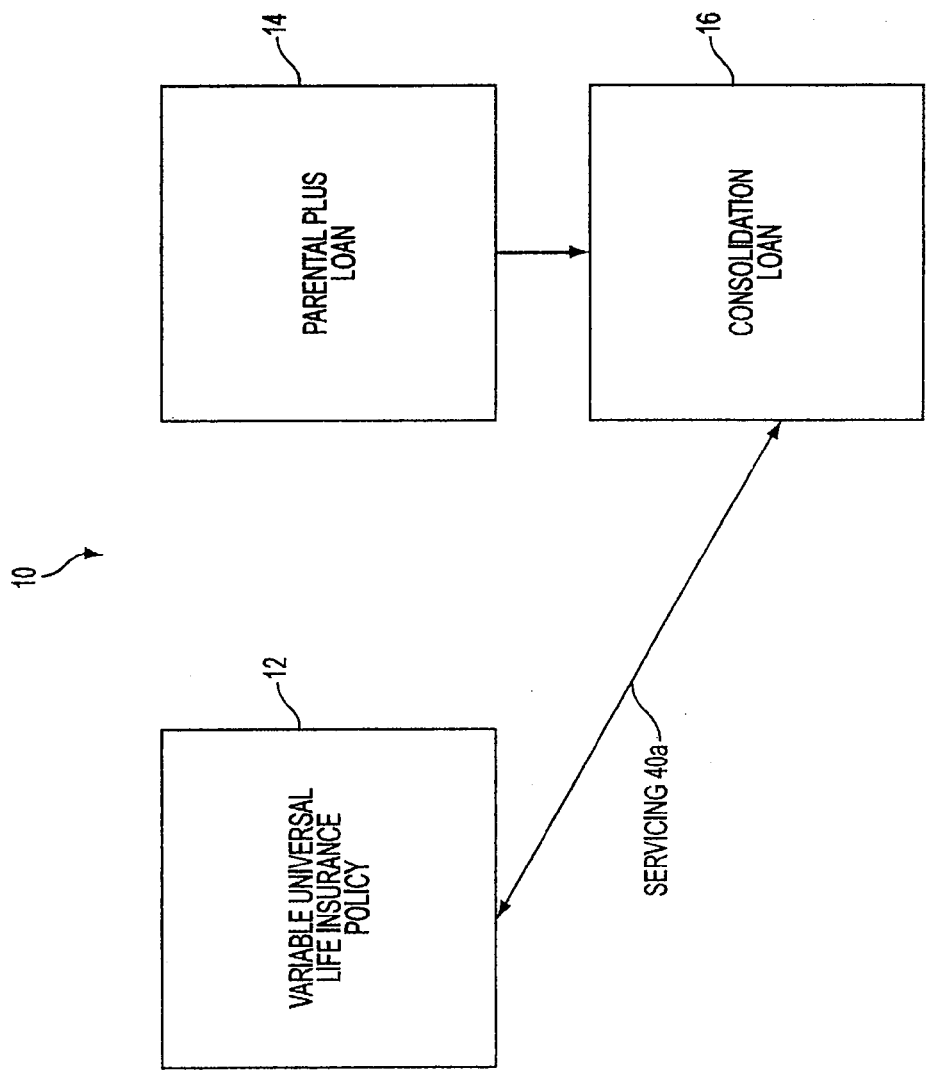

FIG. 2 which shows another embodiment of the financial planning method of the present invention. This embodiment is similar to the embodiment illustrated in FIG. 1, however, in this embodiment, the at least one VULIP is used to service 40a the debt on the consolidation loan.

Figure 3:
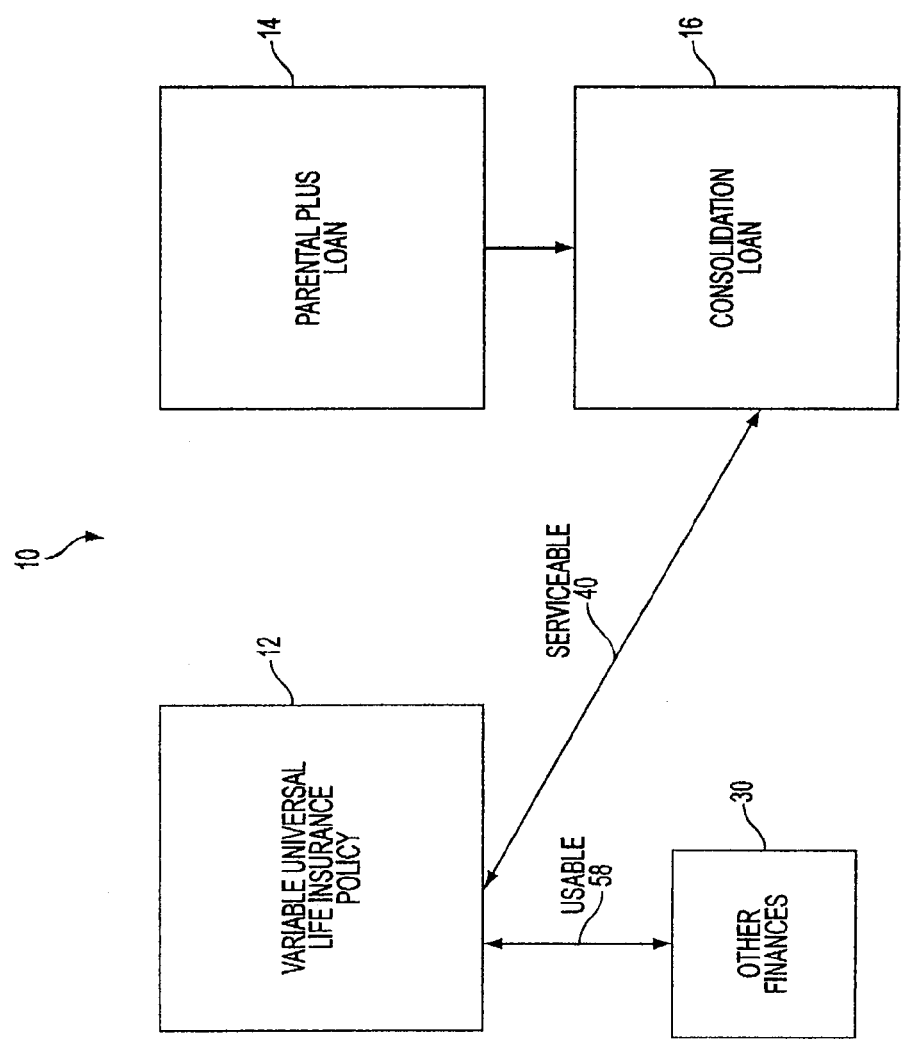

FIG. 3 shows another embodiment of the financial planning method 10 of the present invention. This embodiment is similar to the embodiment illustrated in relation to FIG. 1, however, this embodiment includes other finances 30, and the at least one VULIP is useable 58 for the other finances 30; while at the same time, the at least one VULIP is available to service 40 the debt on the consolidation loan. The other finances 30 will be specific to the person, persons or entities using the financial plan. Other finances 30 could include any use for money or equity; however some of the more common other finances 30 might include, but are not limited to, retirement, living expenses, illness, disability, vacation, medical bills, home improvement and the like.

Figure 4:
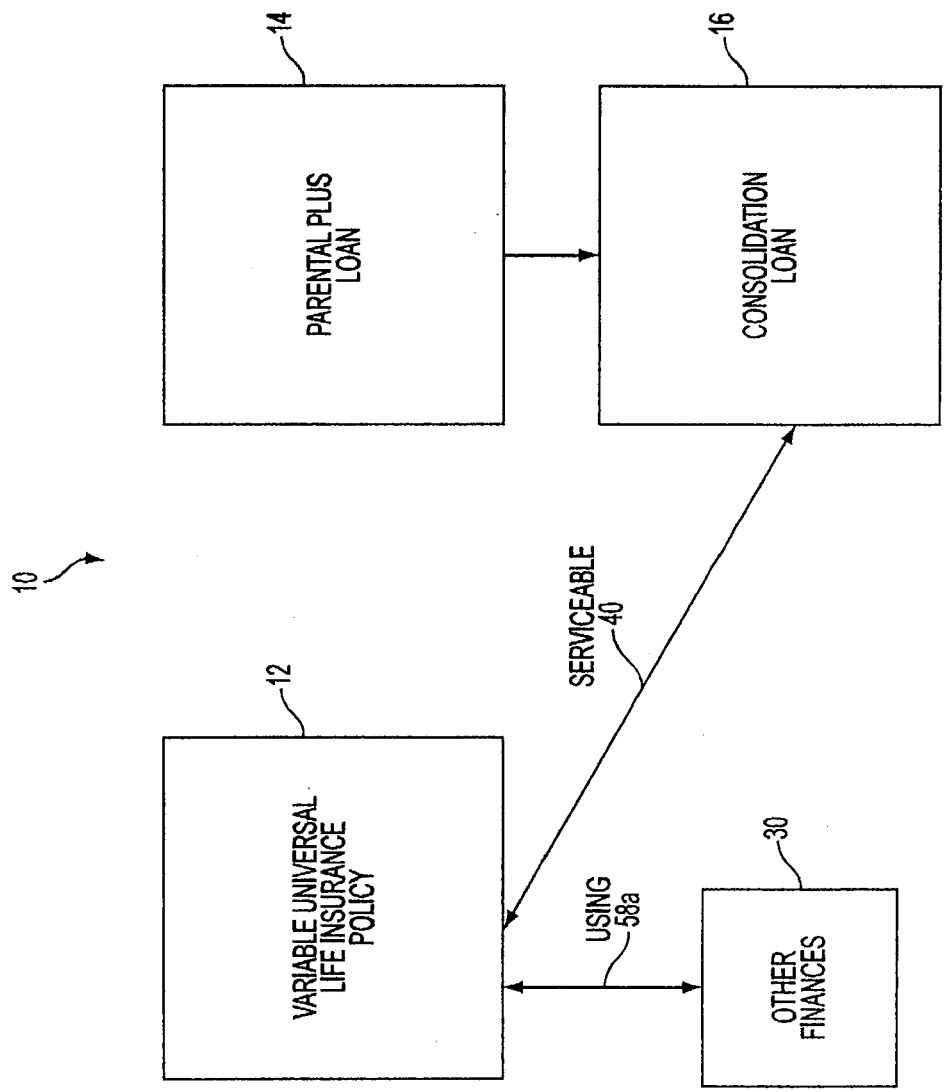

FIG. 4 shows another embodiment of the financial planning method 10 of the current invention. This embodiment is similar to the embodiment illustrated in relation to FIG. 3, however, in this embodiment, the at least one VULIP is used for the other finances 30; while at the same time, the at least one VULIP is available to service 40 the debt on the consolidation loan.

Figure 5:
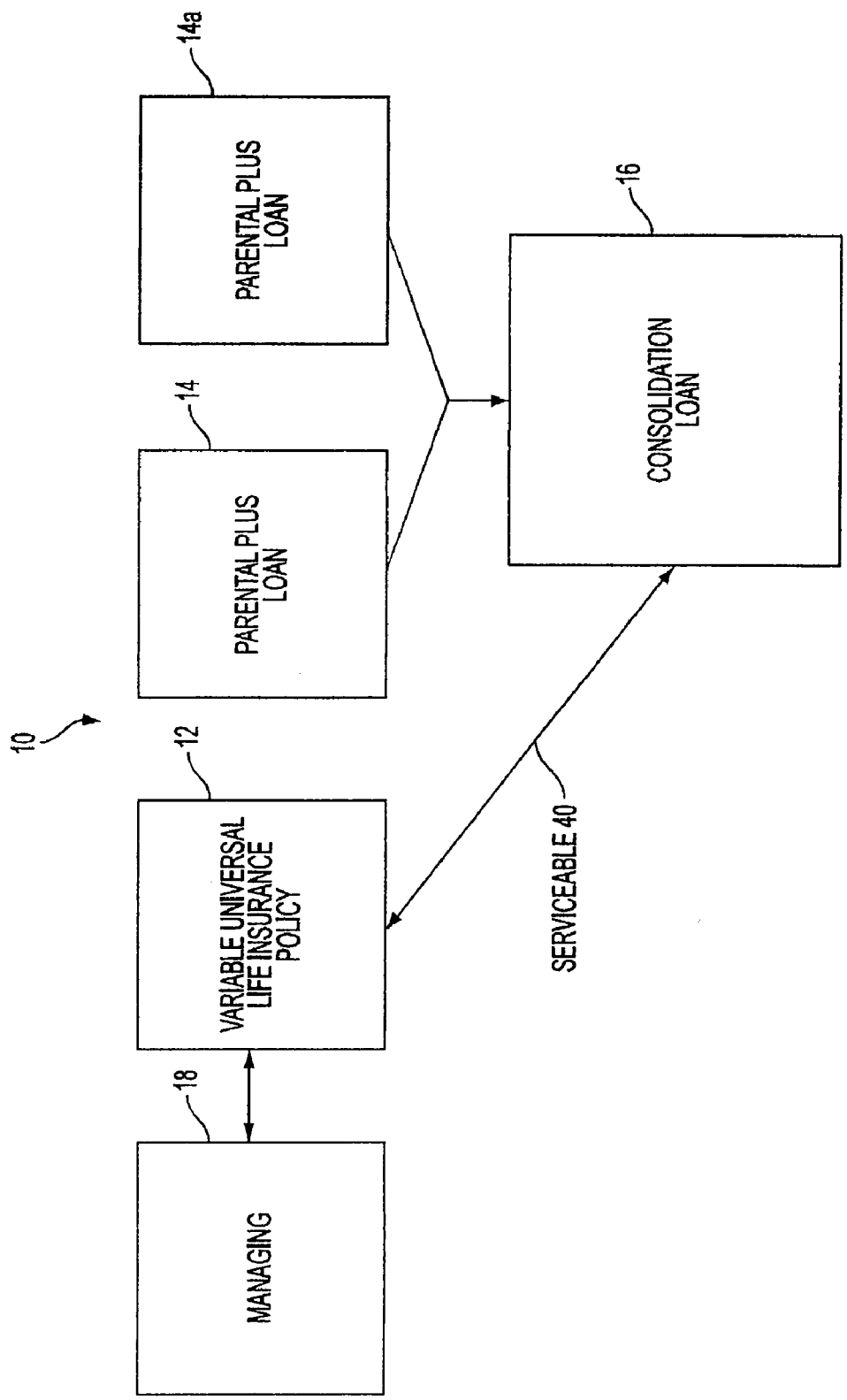

FIG. 5 shows another embodiment of the financial planning method 10 of the present invention. As seen in this embodiment, more than one Parental Plus Loan is obtained 14,14a, which are consolidated 16. In addition, the VULIP is actively managed 18. The active management 18 of the life insurance policy, particularly management by a trained financial advisor/investor, anticipates that the growth of the VULIP will be greater than the growth of the VULIP without active management. However, it is to be understood, that with or without active management, the value of the VULIP is expected to increase over time.

Figure 6:
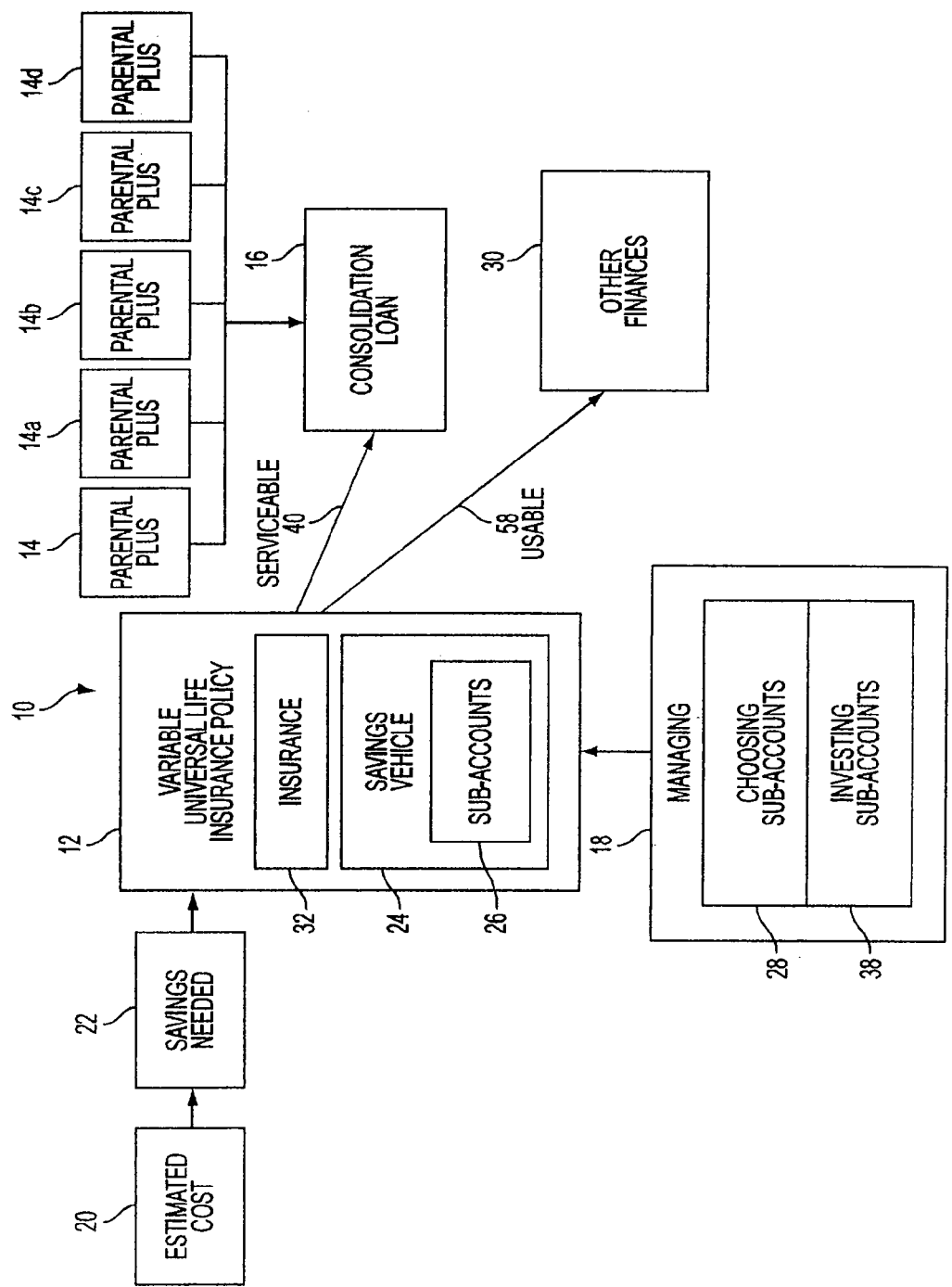
Figure 7:
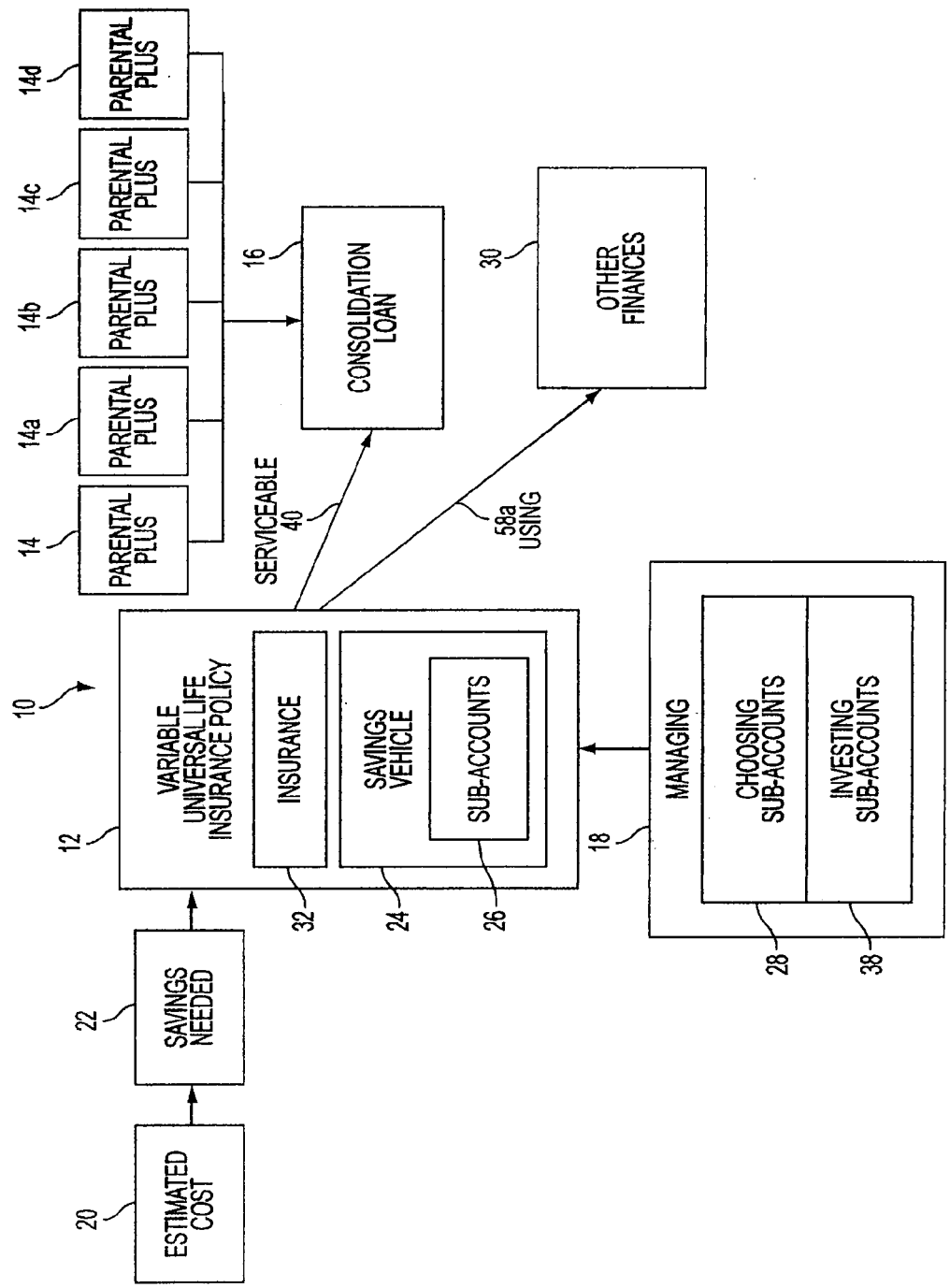

FIG. 6 and FIG. 7 are flowcharts of other embodiments of the financial planning method of the present invention. As seen in these figures, the method includes the step 20 of determining the total estimated cost of education for a student. The estimated costs may be determined in any manner that the planner chooses, which are known in the art or to be discovered. In addition, the number of years between when the estimated cost is determined 20 and when the student will begin and/or complete his or her education may effect the approach taken for determining the estimated costs, and the ability to derive a close estimate.

An approach which may be used to determine 20 the total estimated cost of education for a student, which is included for exemplary purposes and not intended to be limiting, includes the following:

1) ascertain the current yearly cost of the education;
2) calculate the years until the student begins the education; and
3) estimate a cost inflation factor of 6%.

In addition, if the education is a college education for the student, the planner may add costs for 4.9 years because most current college students require additional summer courses or additional semesters to complete a standard four-year degree program at most colleges and universities today. Accordingly, by way of example only, the determination 20 of the total estimated cost of education for the student could be calculated as follows:

| Assumptions: | |
| --- | --- |
| Current yearly college cost | $20,000 |
| Years to start of college | 18 |
| Estimated college cost inflation factor | 6% |
| Results: | |
| Estimated future college costs (year 1) | $57,086.78 |
| The future value for year 18 (year 2) | $60,511.99 |
| The future value for year 19 (year 3) | $64,142.71 |
| The future value for year 20 (year 4) | $67,991.27 |
| The future value for year 21 (year 4.9) | $64,863.67 |
| (90% of the future value for year 21.9) | |

After the determining the total estimated cost of education for a student step 20 is completed, the next step 22 is calculating the amount of annual savings needed. The planner may use any method known in the art or to be discovered that he or she chooses to calculate 22 the annual savings needed. However, an exemplary procedure includes the following:

1) taking the determined total estimated costs from the previous step 20;
2) utilizing a discount rate of 7%;
3) applying the 7% discount rate for the assumed period, which may be the beginning of the final year of education for the student.

As a result, by way of example only, the calculating the amount of annual savings needed step 22 could be as follows:

| Assumptions: | |
| --- | --- |
| Future college costs | $314,596.42 (from step 20) |
| Assumed discount rate | 7% |
| Assumed Period | 22 years (from birth until the beginning of the final year of college) |
| Results: | |
| Amount of annual savings needed | $6,419.58 |
| Amount of monthly savings needed | $503.64 |

If savings are accumulated on a monthly basis, slightly less than $1/12^{th}$ of the annual requirement is needed because of compound interest.

As known in the art, the assumed discount rate is a mathematical model which is similar to that used to determine a mortgage rate.

Figure 8:
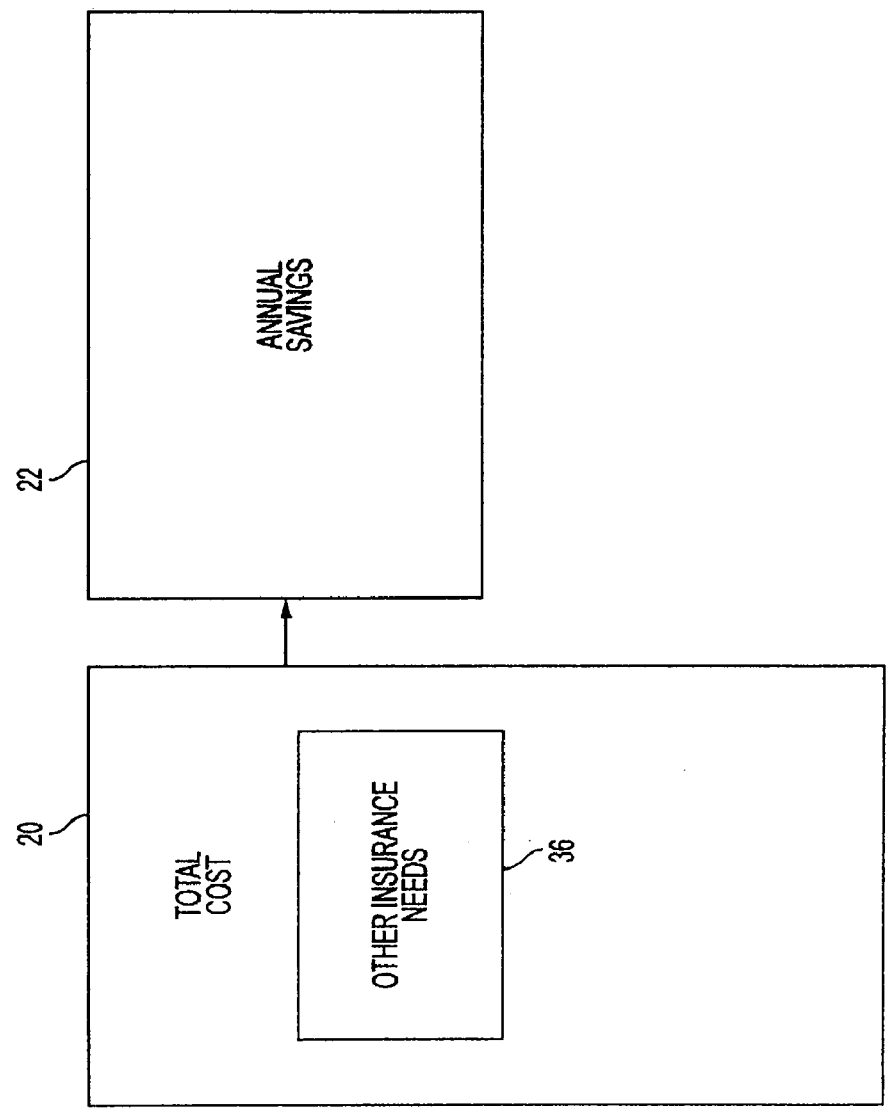
Figure 9:
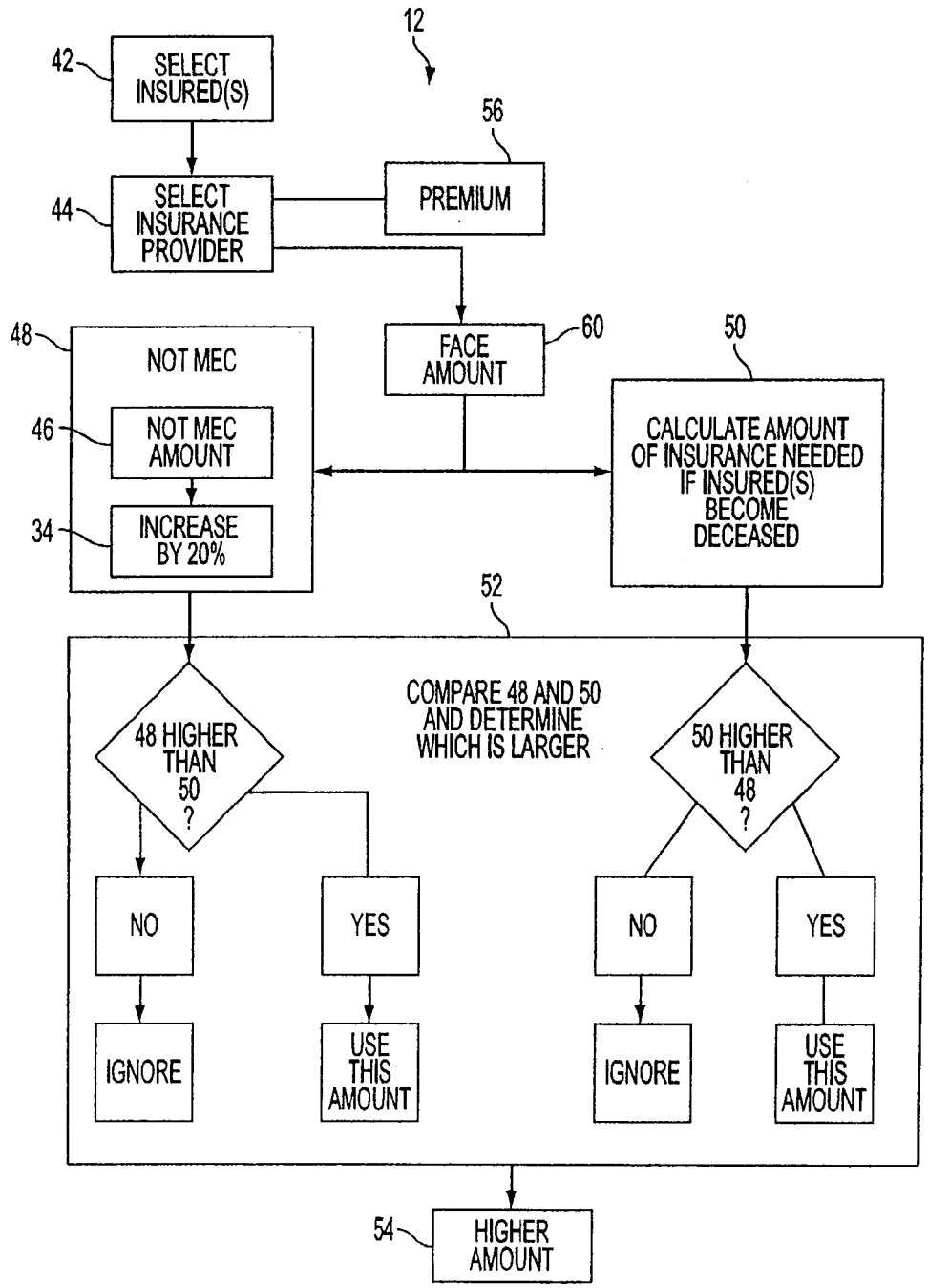
FIG. 9 is a flowchart of the step in the first preferred embodiment of the present invention of establishing at least one Variable Universal Life Insurance Policy.

As seen in FIG. 8, the determining the total estimated cost step 20 optionally can include the step 36 of adding other insurance needs. The other insurance needs will be specific to the person for whom the financial plan is being made. Generally, the financial planner will determine whether adding 36 other insurance needs to the VULIP would be a more efficient and/or secure manner of investing than other financial planning mechanisms available. Other insurance needs could include a wide array of needs; however, some of the more common insurance needs might include, but are not limited to, retirement, living expenses, illness, disability, vacation, and the like.

As further seen in FIG. 8, whenever the financial planner decides to add 36 other insurance needs in the determining total estimated cost step 20, the added 36 other insurance needs also would have an impact on the calculating amount of annual savings needed step 22.

As further seen in FIG. 8, whenever the financial planner decides to add 36 other insurance needs in the determining total estimated cost step 20, the added 36 other insurance needs also would have an impact on the calculating amount of annual savings needed step 22.

Now, continuing to refer to FIG. 6 and FIG. 7 the next step 12 is establishing at least one VULIP on at least one life allowed by law. As well known in the art, the VULIP is both insurance 32 and a savings vehicle 24.

When establishing 12 a VULIP, the planner must insure at least one life allowable by law. Since the plan anticipates at least a post-secondary, non-graduate education, the VULIP generally will be on a life which may be insured for the benefit of the student. Currently the law allows the life to be any person in whom an insurable interest can be confirmed.

The at least one VULIP may be established 12 on one insurable life or on a combination of insurable lives. If the life of just one person is insured, the planner often will select a parent. If one parent will be insured, the planner may choose either parent. Factors that the planner may want to consider when selecting a parent to be insured is which parent is healthiest, and presumably most insurable, or which parent represents the largest income producer to the family to be insured. It is to be understood that this example is exemplary only, and not intended to be limiting.

Once the life and/or lives to be insured are identified, the planner will select a low-load or no-load insurance provider to provide the VULIP. As known in the art, a low-load insurance provider receives commission primarily for managing the policy over time; and does not receive a large commission for selling the insurance. The insurance planner in a no-load insurance policy does not receive a profit on the sale of the policy.

FIG. 6 shows a flowchart of the establishing at least one Variable Universal Life Insurance Policy step 12 of the present invention. As seen in this figure, establishing 12 a VULIP includes the step 42 of selecting the insured(s). Another step 44 is selecting the insurance provider. Thereafter, the planner will engage in the step 56 of determining a premium amount and the step 60 of determining a face amount. The planner may use the monthly savings amount as the premium 56 to be placed into the VULIP.

In order to determine the face amount 60, at least two calculations must be made and compared. The first calculation 48 that must be made includes the step 46 of computing the face amount as the minimum amount that will not make the new policy a modified endowment contract ("MEC") under the tax code. As well known in the art, the Internal Revenue Service Code defines an insurance policy which is not considered a modified endowment contract ("MEC"). As a result, as well known in the art, if too much money is put into the VULIP savings vehicle, the VULIP becomes a MEC. If the VULIP becomes a MEC, the plan is not expected to fulfill its intended purpose. Optionally, step 48 will include taking the figure derived in step 46 and increasing 34 it by 20% to provide room for extra savings when available.

The second calculation 50 that must be made is to calculate the actual amount of insurance needed to totally fund the savings program if the insured person, or any combination of the insured persons, should become deceased before the insurance program is completed. Preferably, this calculation 50 should be based on the insured person, or any combination of the insured persons, becoming deceased the very day that the program is initiated. As a result, even if the insured person, or any combination of the insured persons, became deceased on the day the program was initiated, the financial plan still would fulfill its intended purpose.

By way of example and not intending to be limiting, using the figures from the previous examples, the actual amount of insurance needed to totally fund the savings program if the parent should immediately become deceased would be $71,008.67; based on the following calculation:

| Assumed: | |
|---|---|
| Future cost of college | $314,596.92 |
| Assumed growth rate | 7% |
| Assumed period | 22 Years |
| Result: | |
| Minimum insurance need | $71,008.67 |

Thereafter, the figures that are derived from step 48 and step 50 are compared in the next step 52 to determine which total is larger. The next step 54 is ascertaining the higher amount.

The at least one VULIP may be purchased in the amount ascertained in step 54. However, optionally, before purchasing the VULIP, the planner, after ascertaining the figure from step 54, also could analyze the total insurance needs of the proposed insured and encompass the additional needs into the at least one VULIP; assuming that no large contingent deferred sales loads are present in any existing insurance product. As a result, the planner might want to increase the amount of insurance to be purchased beyond the figure obtained in step 54.

If the planner is a Certified Financial Planner™, the planner is required to thoroughly analyze the total insurance needs of the proposed insured before purchasing the VULIP. The factors which may be considered include, but are not limited to, savings needed for education, other financial needs which would be best utilized in a VULIP, including retirement, vacations, and the like. It is important to note that the planner should be careful that the plan does not result in a backend sales charge, which is known in the art as payment for a commission that is not used.

In addition, to meet the designed cash flow, the planner may take into consideration a variety of factors. Initially, the planner may want to consider the anticipated amount needed to pay the consolidation loan payments. In addition, optionally, the planner might want to prepare for cash flow that would service the Parental Plus Loans. Other factors that may be taken into consideration include but are not limited to:

1) cash flow or insurance being eliminated or exchanged pursuant to Section 1035 into a new policy, thereby providing new cash flows;

2) consider elimination of cash flows to other retirement vehicles such as 401(k), 419, 403(b) and the like; and 3) consider having the family identify surplus funds by tracking all expenditures; money management software to track all expenditures is available on the market.

It is important to note that the financial planning method 10 of this invention can be a savings vehicle for the whole family unit, which can provide just as much tax shelter as other retirement vehicles. Additionally, the planner may choose to add more to the amount of the premium and face amount of the VULIP to have enough savings in the VULIP to provide payment for pre-college education costs for a student. Pre-college education costs for a student could include, but are not limited to, private school tuitions for all pre-college schooling, including preschool, through high school. Also, the potential cost of graduate school can be included.

If the planner in the selecting insured(s) step 42 chooses to insure more than one life, preferably any amount may be included in the respective VULIP policies as long as upon adding both policies together the calculations under steps 48 and 50 would be the same as if only one life were insured. Ideally, the planner would calculate the premium and face amounts for each insured so that the purpose for the plan would be fulfilled if, even on the day of initiating the plan, any of the lives ended in any possible combination.

As further seen in FIG. 6 and FIG. 7, these embodiments of the method may include managing 18 the at least one VULIP. The managing step 18 preferably may include choosing 28 the sub-accounts and/or investing 38 the sub-accounts; however, it is to be understood that any kind of managing known in the art or to be discovered could be used. Managing 18 the at least one VULIP is optional. In addition, if the VULIP is not managed, it is expected that the at least one VULIP will grow over time. However, if a VULIP is managed 18, particularly by someone skilled in financial planning, the growth of a VULIP is expected to be greater than if management 18 does not occur. Ways in which the VULIP may be managed include, but are not limited to, anticipating that the time horizon for the program is upwards to 52.9 years (for the time period from birth of the student until 30 years following graduation from post-secondary undergraduate education,) which allows for a very aggressive or tactical approach for sub-account monitoring. Long-term targets for the management of the sub-accounts should exceed 12%. Tactical-asset management of the sub-accounts with the use of hedge funds or sector rotation is appropriate for the anticipated timeframe and is preferable as the primary approach for the program. Tactical-asset management, as known in the art, is available through financial planners such as Discovered Treasures, Inc., at P.O. Box 144, Oley, Pa. 19547. As known in the art, tactical-asset management is the opposite of "asset allocation," which involves allocating the funds and leaving them alone. In addition, a daily monitoring process is preferred and would be expected to enhance the future value of the savings program.

As further seen in FIGS. 1–7, the method 10 includes the step 14 of obtaining annually, if needed, at least one federally guaranteed Parental Plus Loan. The Parental Plus Loan may be for any amount, up to the cost of the undergraduate program, desired, however preferably, the amount would be for the total of all annual education costs not covered by other grants and scholarships received by the student. As known in the art, educational costs include, but are not limited to, room and board, tuition, books, and special equipment, such as art supplies. As a result, preferably, if the student received grants and/or scholarships that covered all of the total annual education costs for one year, the student would not obtain a Parental Plus Loan for that year. In the embodiment illustrated in FIG. 6 and FIG. 7, the obtaining Parental Plus Loans step 14, 14*a*,14*b*,14*c*, 14*d* occurs for 4.9 years. This illustration is exemplary only, and is not intended to be limiting.

By way of example, for a college student obtaining Parental Plus Loans for 4 years, the following procedure would be enacted:

I. First Year of College Entry

Do not use the funds in the savings vehicle to pay for the out of pocket costs to send the student to college.

Do not accept any college "student" loans offered by the college.

Do pay for all remaining costs after scholarships, grants or work study with a Parental Plus loan. If the parent is unable to service the payments on the Parental Plus Loan from current income, and only if the parent is unable to service the payments on the Parental Plus Loan from current income, withdrawals or loans may be taken from the savings vehicle without any taxes to service the shortfall.

Example:

Total cost of college $64,000

Less grants and scholarships $24,000

Net Parental Out of Pocket cost $40,000

Monthly payments on 10-year Parental Plus Loans $460.12

(Assuming 6.79% interest)

II. Second Year of College

Do not use the funds in the savings vehicle to pay for the out of pocket costs to send the student to college.

Do not accept any college "student" loans offered by the college.

Do pay for all remaining costs after scholarships, grants or work study with a Parental Plus loan.

If the parent is unable to service the payments on the Parental Plus Loan from current income, and only if the parent is unable to service the payments on the Parental Plus Loan from current income, withdrawals or loans may be taken from the savings vehicle without any taxes to service the shortfall.

III. Third Year of College

Do not use the funds in the savings vehicle to pay for the out of pocket costs to send the student to college.

Do not accept any college "student" loans offered by the college.

Do pay for all remaining costs after scholarships, grants or work study with a Parental Plus loan.

If the parent is unable to service the payments on the Parental Plus Loan from current income, and only if the parent is unable to service the payments on the Parental Plus Loan from current income, withdrawals or loans may be taken from the savings vehicle without any taxes to service the shortfall.

IV. Fourth Year of College

Do not use the funds in the savings vehicle to pay for the out of pocket costs to send the student to college.

Do not accept any college "student" loans offered by the college.

Do pay for all remaining costs after scholarships, grants or work study with a Parental Plus loan.

If the parent is unable to service the payments on the Parental Plus Loan from current income, and only if the parent is unable to service the payments on the Parental Plus Loan from current income, withdrawals or loans may be taken from the savings vehicle without any taxes to service the shortfall.

Continuing to refer to FIG. 6 and FIG. 7, in these embodiments of the method 10 the next step 16 is consolidating the at least one Parental Plus Loan into at least one consolidation loan. Currently the preferred consolidation loan is a Sallie Mae loan. However, any consolidation loan, currently known or to be offered in the future, is intended to be within the scope of the invention. While the Sallie Mae loan may be taken out for any amount of time up to 30 years, it is preferred that the Sallie Mae loan be taken for the full 30 years. The benefit of taking the longest amount of time for the Sallie Mae loan includes, but is not limited to, stretching the term so that the money stays in the VULIP policy and gives a tax free benefit for a longer period of time. In addition, it is within the scope of the invention to consolidate the at least one Parental Plus Loan into more than one consolidation loan.

The method 10 includes consolidating the Parental Plus Loans after the last Parental Plus Loan is obtained 14. Often, this will be during the last year of the college education of the student.

The following is an example of the consolidating 16 step. It is to be understood that the following example is for exemplary purposes only and is not intended to be limiting:

Example: Monthly Payment:
Balance year 1 loan=$28,057.35—$460.12
Balance year 2 loan=$31,544.09—$460.12
Balance year 3 loan=$34,802.56—$460.12
Balance year 4 loan=$37,847.70—$460.12
Total for consolidation=$132,251.70—$1,840.48
Interest only for first 4 years=$748.33
Year 5 graduated payment=$813.09
Year 6 graduated payment=$868.49
Year 7—288 payments=$923.89

While servicing the consolidation loan payments with the VULIP is possible, preferably the user of the method 10 will service the required consolidation loan payments first from current sources of income and secondly from withdrawals and loans from the savings vehicle of the VULIP. The benefit of servicing the consolidation loan payments with current sources of income is that the funds remaining in the VULIP are tax sheltered. However, it is to be understood that it is within the scope of this method 10 for the consolidation loan payments to be exclusively serviced 40 from the VULIP.

If the savings vehicle in the VULIP is aggressively managed, it is expected that significantly more growth will be seen in the at least one VULIP than would be needed to service the extended Sallie Mae loan, or other at least one consolidation loan. The remaining funds in the VULIP could be used 58 for other financial needs and/or desires 30 of the user of the method 10.

As seen in FIG. 6, this embodiment of the method 10 anticipates that the at least one consolidation loan 16 is serviceable by the at least one VULIP, and that the VULIP also is usable 58 for other finances 30. In FIG. 7, while the at least one consolidation loan 16 is serviceable by the at least one VULIP, if the parent, or other person or entity using the plan, were able to service the payments on the at least one consolidation loan from current income, the at least one VULIP would not have to be used to service the at least one consolidation loan. As a result, the parent, or other individuals or entities using the plan, would be able to use 58a the at least one VULIP for other finances 30.

The financial planning method 10 of the current invention is very flexible. The parent or guardian may use any excess funds for any purpose without taxes if the rules relative to withdrawals and loans in variable universal life insurance policies are properly followed. Especially with proper orientation and education by a Certified Financial Planner™, one should be able to utilize the financial planning method 10 utilizing benefits in the tax code and potentially have the full education expenses covered by the excess returns over cost basis of the savings vehicle. As known in the art, cost basis includes premiums, management of the sub-accounts and interest expense on the Parental Plus Loans.

Figure 10:
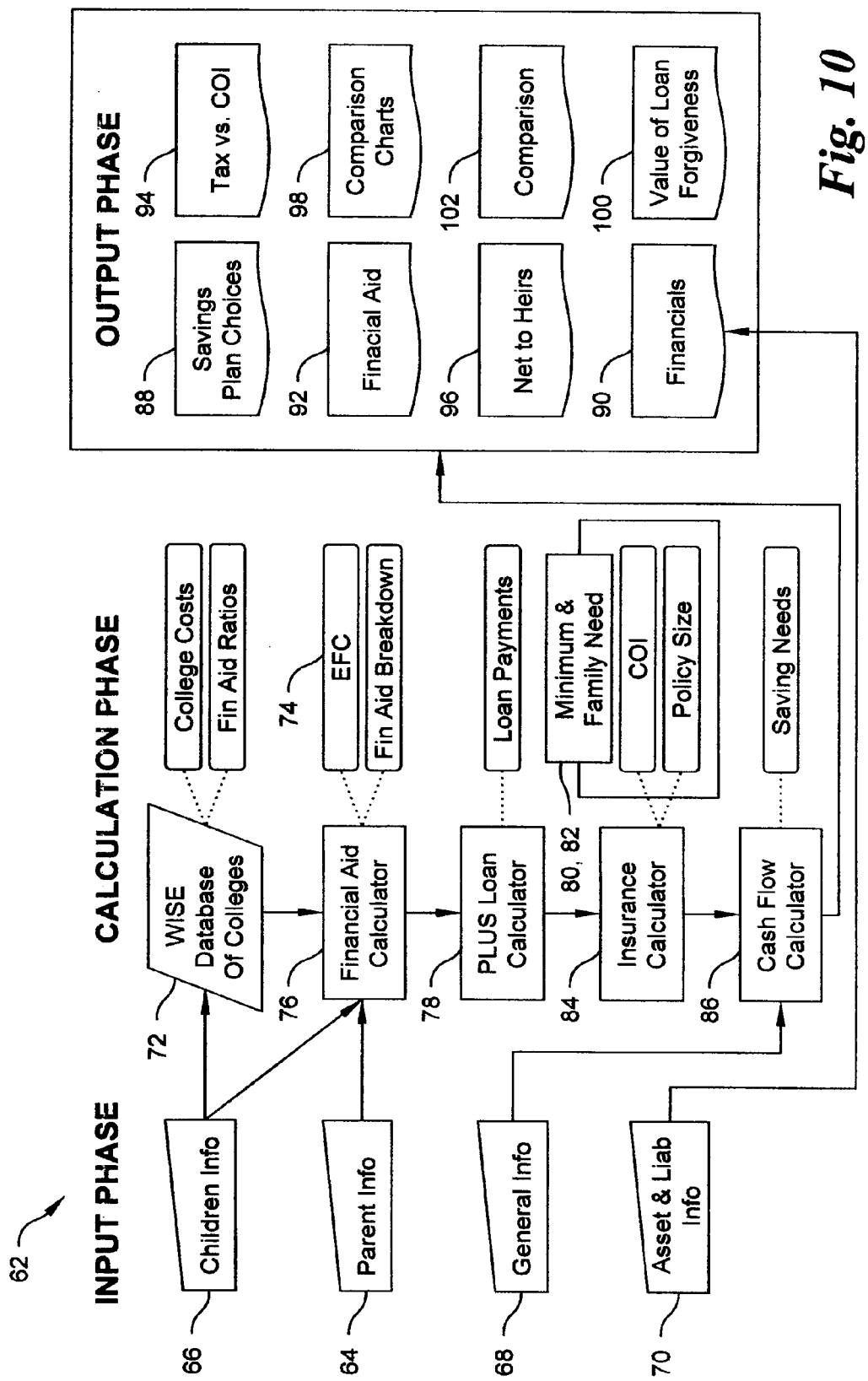
FIG. 10 is a flowchart of an overview of another preferred embodiment of the present invention.

FIGS. 10–21G show another preferred embodiment of the present invention. FIG. 10 is a flowchart 62 of an overview of the embodiment. The following outline describes the different aspects of the WISE College Savings Plan program. The outline details the input phase, the calculation phase and the output provided to the client.

Figure 14:
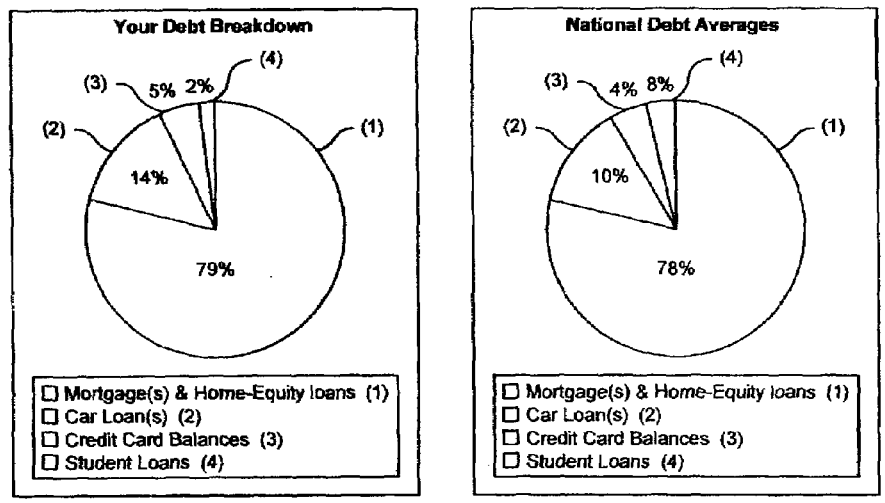
Figure 16A:
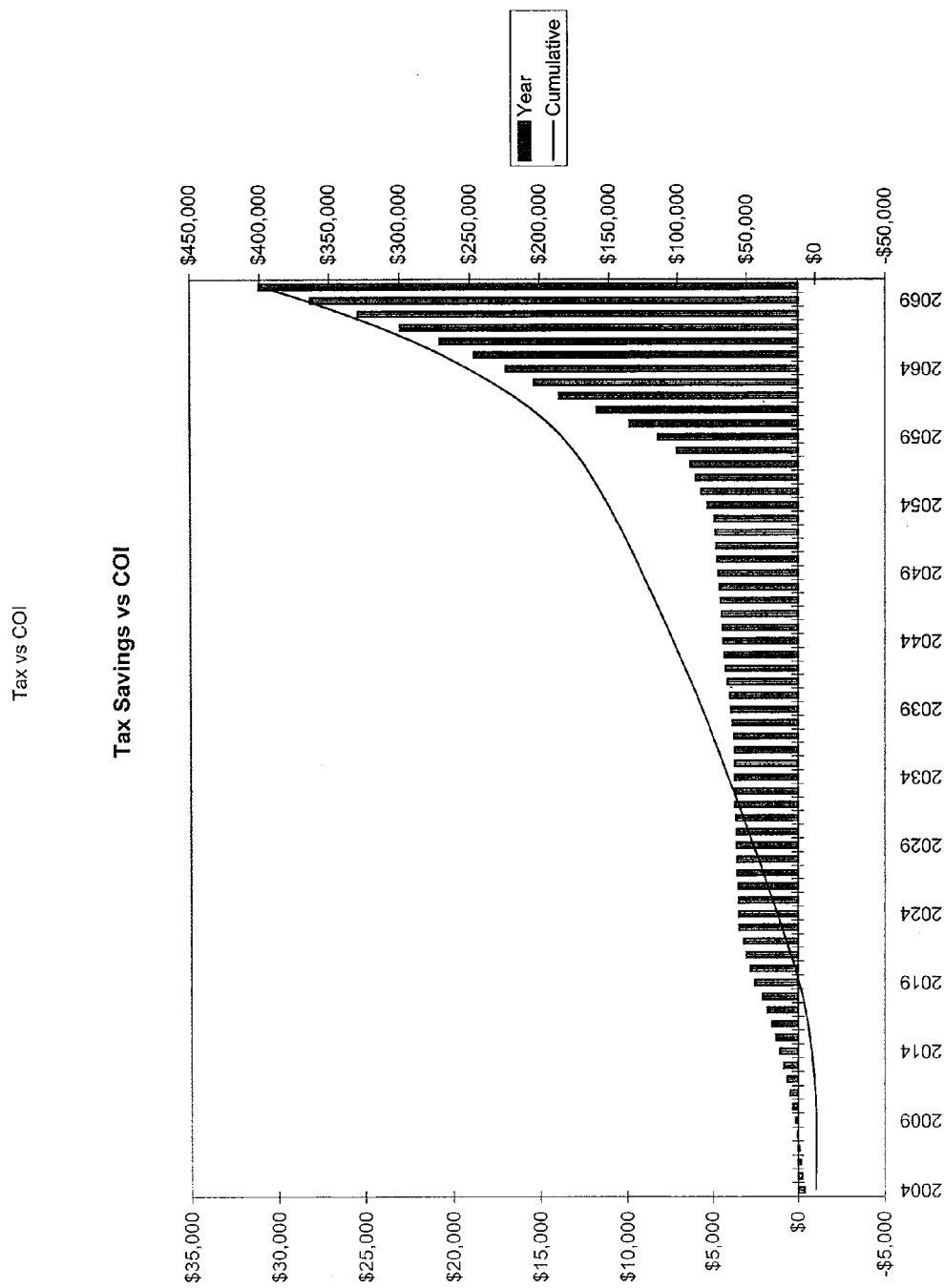
Figure 16B:
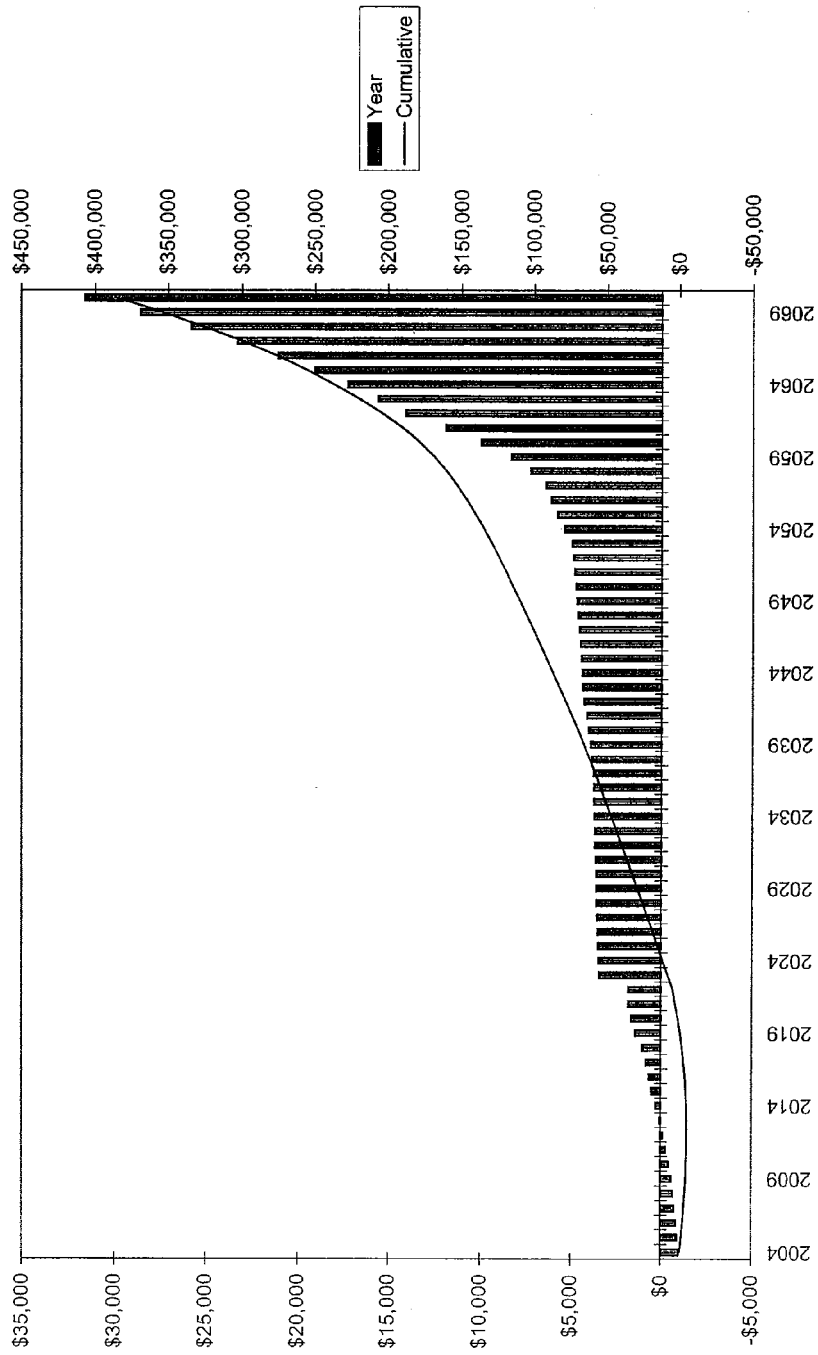
Figure 17:
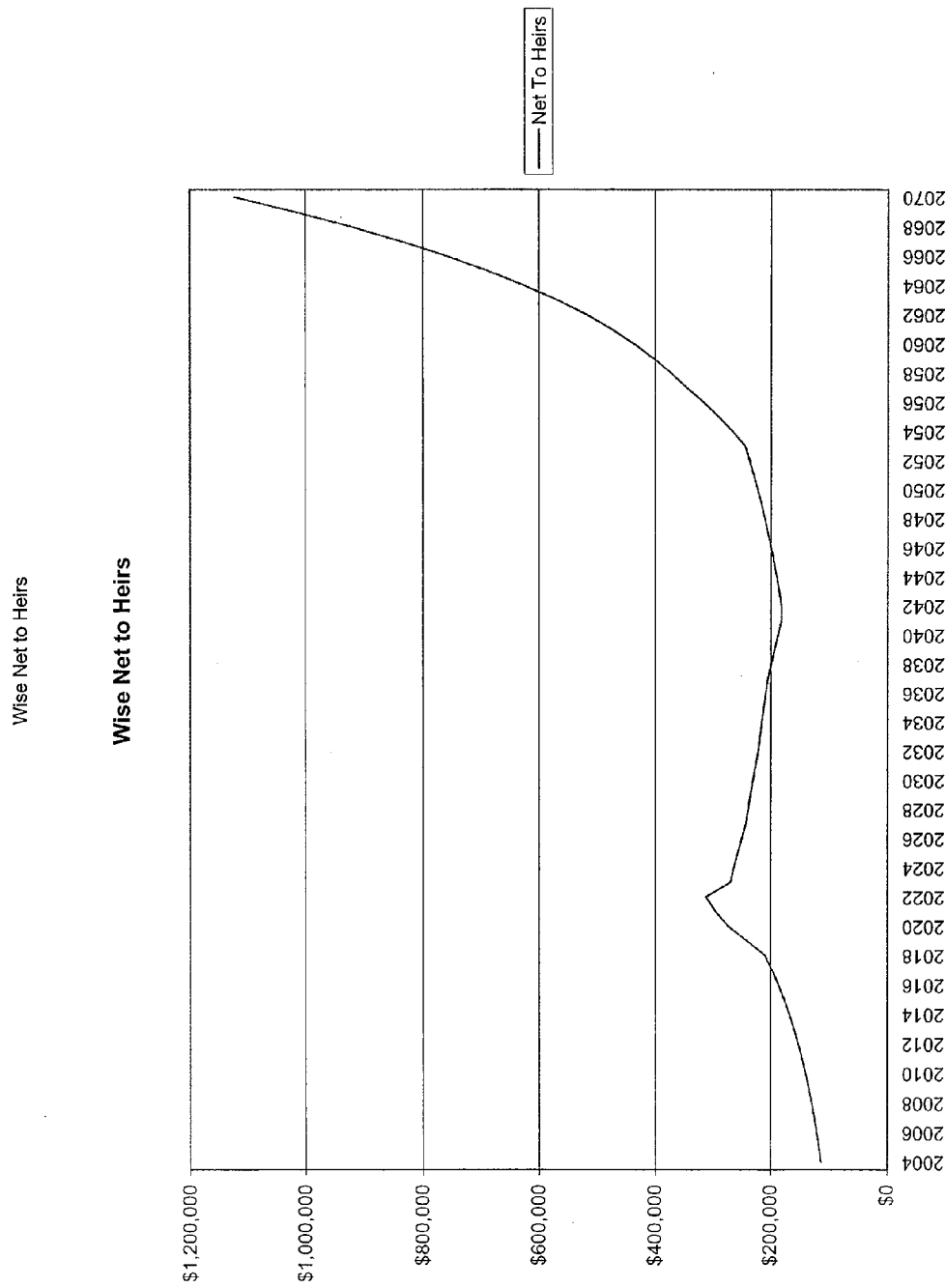
Figure 18B:
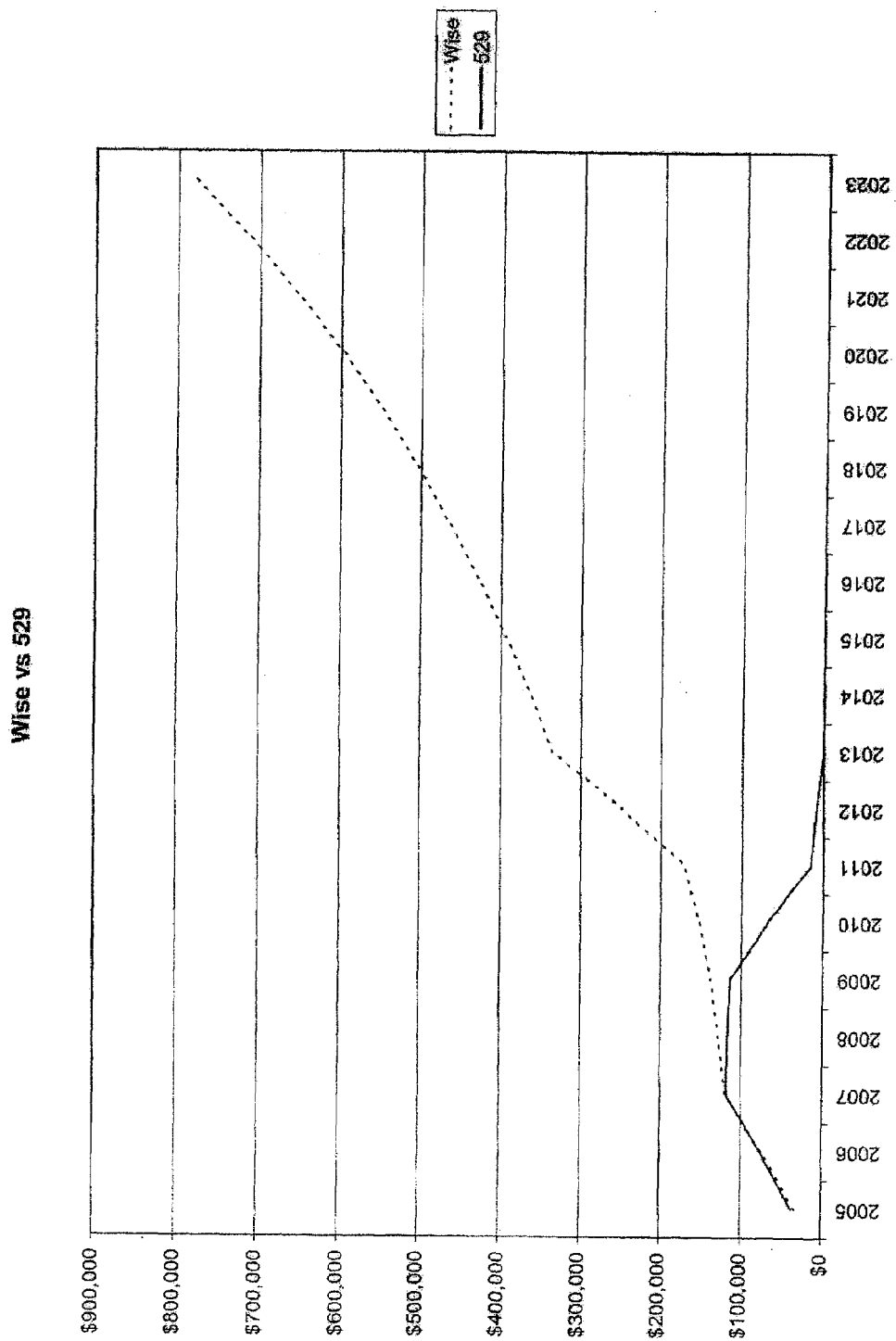
Figure 18C:
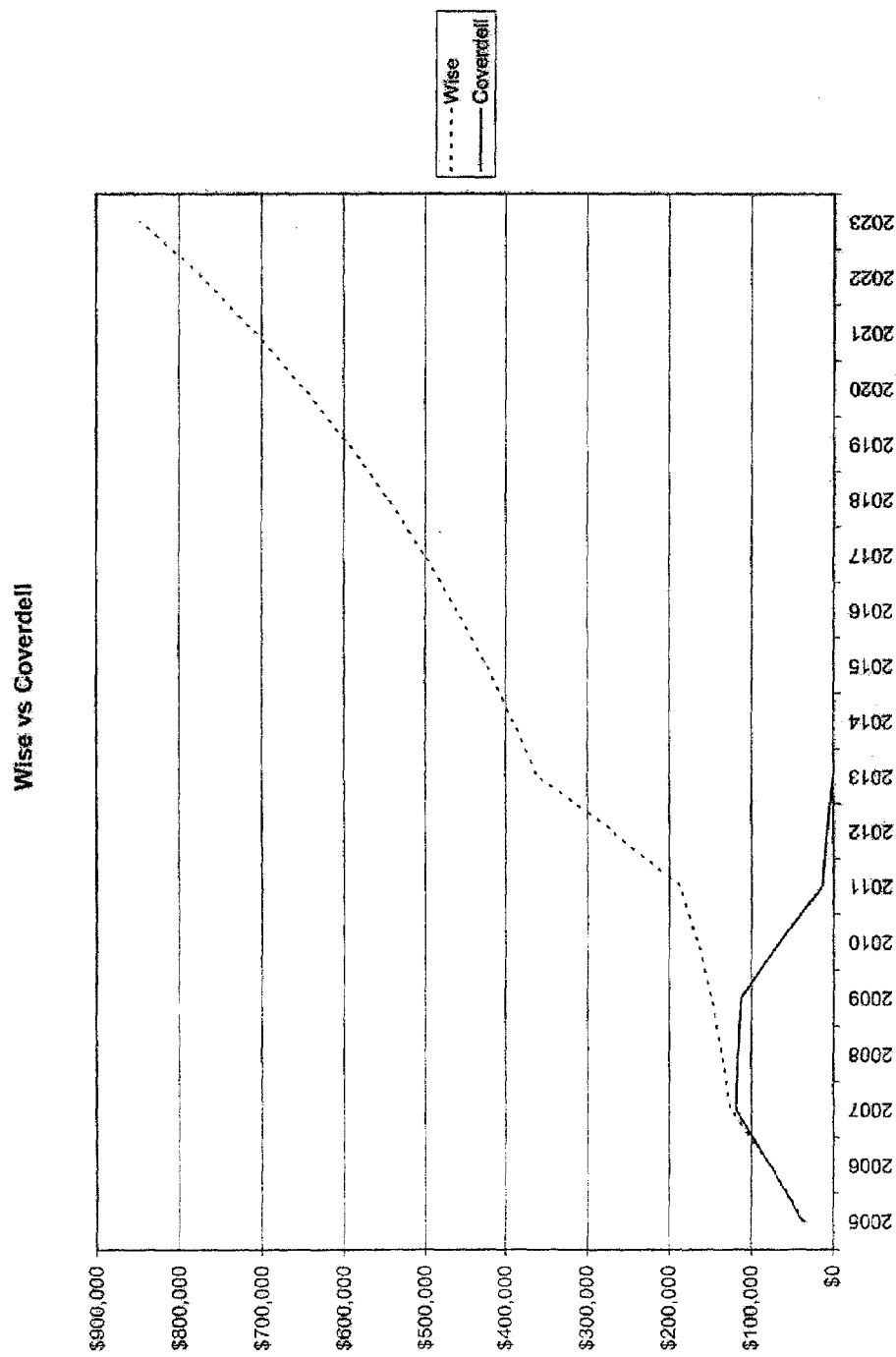
Figure 18D:
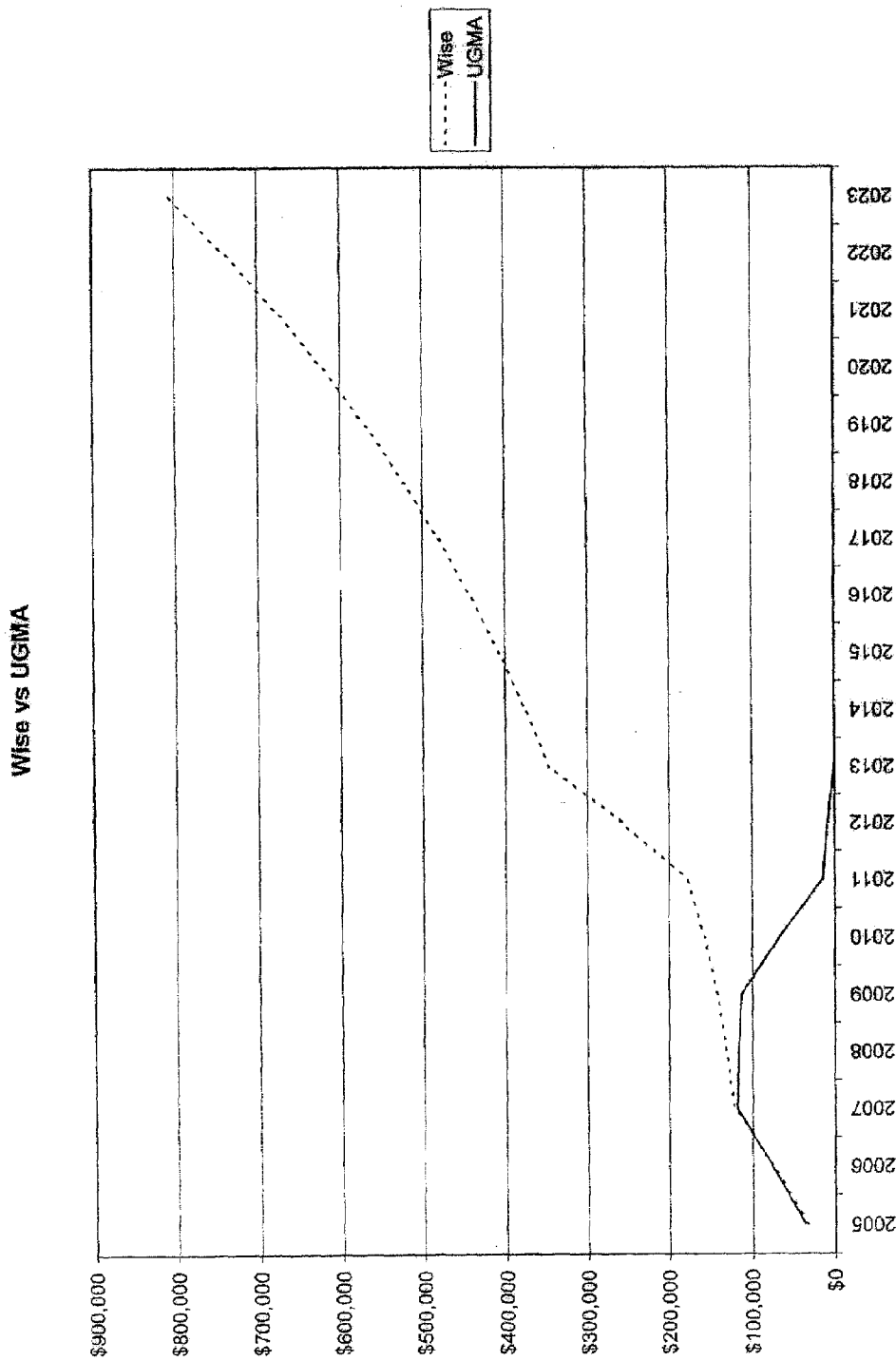
Figure 18E:
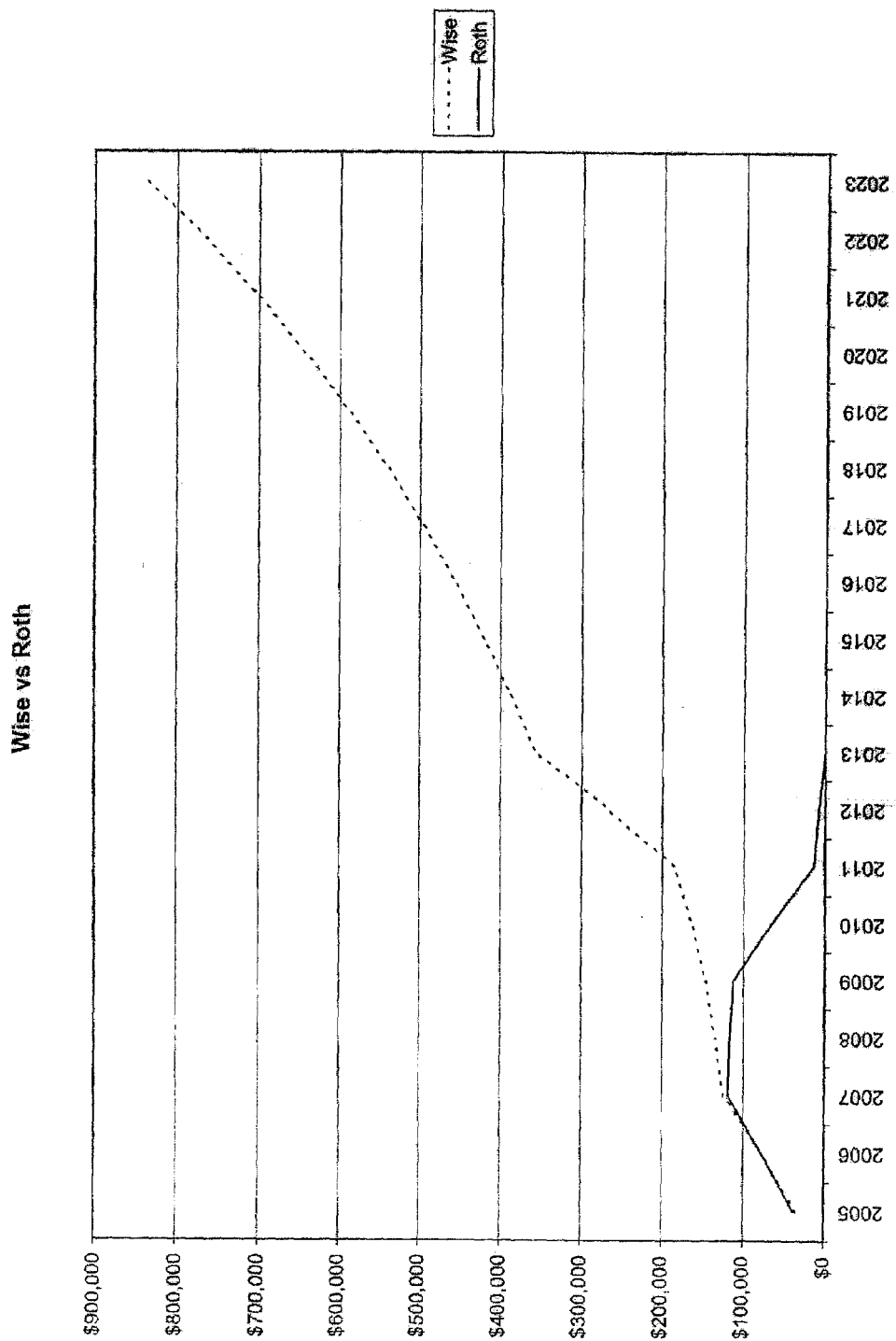
Figure 18F:
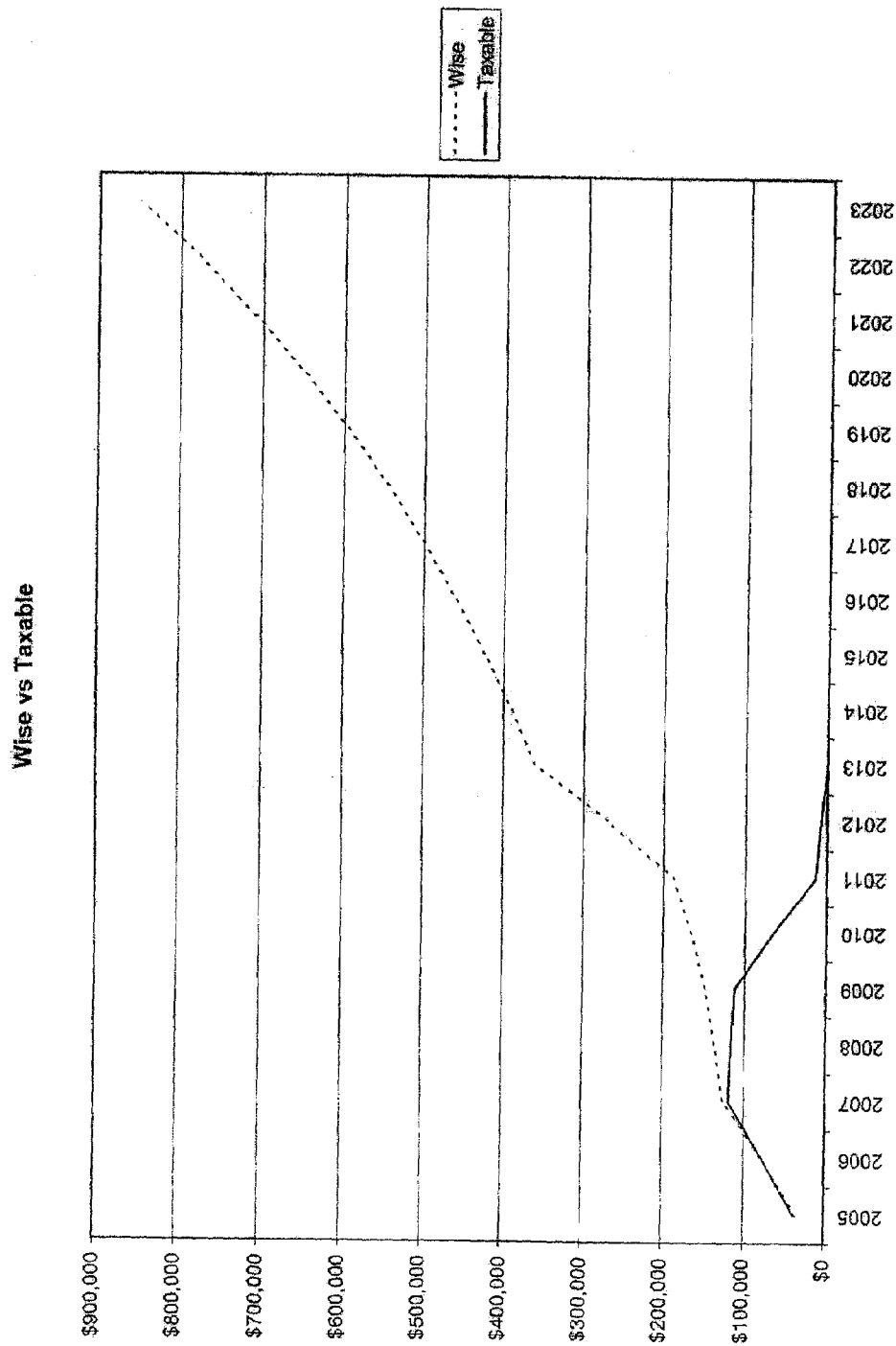
Figure 19:
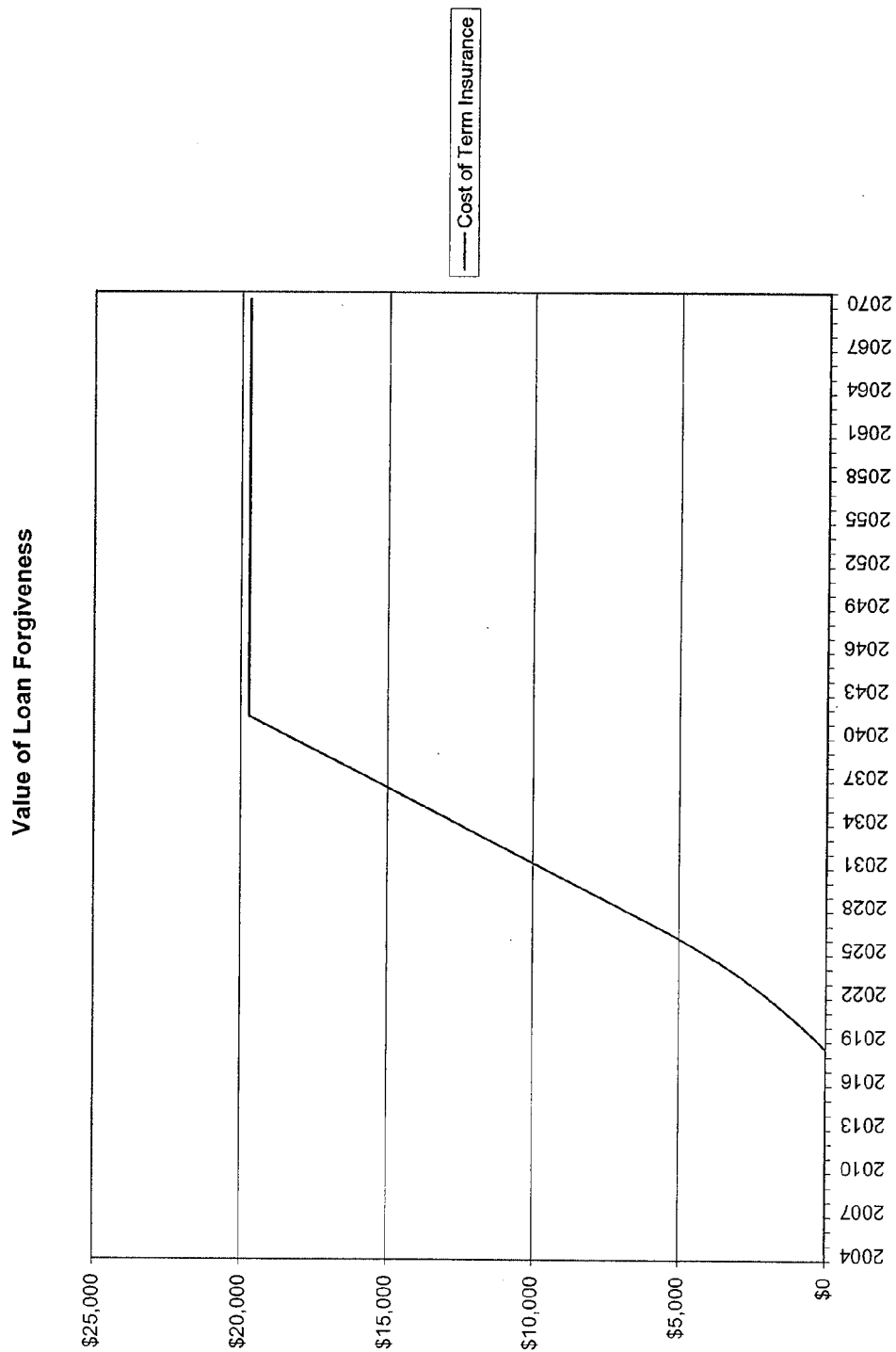

1. Input phase—Collect information needed for input sheet (FIGS. 11A–11D)
   a. "Parent Information" 64 needed consists of their names, ages, income (including tax details) and assets. This information is used in calculating financial aid benefits. (FIG. 11A)
   b. "Children's information" 66 consists of their names, ages, income and assets. Also part of the children's information the parents must provide some assumptions about college. First the parents need to decide what percent of the college costs they want to provide. In some cases the parents want to plan on the child paying for a portion of their own education. Than the parents must decide which college/university they would like to plan for. The parents must decide if they want to plan for the full cost of college or the expected cost. The expected cost of college is the parents cost after any financial aid has been factored in. Lastly the parents must decide how many years of school to plan for. The normal answer is 4 years but the program can handle up to 5. (FIG. 11B)
   c. The "General Information" 68 section consists of specific details of the savings plan. Details needed include the initial investment made by the client, the number of years they want to save, the expected rate of return (the program can handle up to 12%) and when the parents want to start the savings plan. There is also a section if the parents need additional insurance beyond their college savings needs. The parents can also elect to have their annual investments increase by a fixed percent. This will cause the beginning payments to be lower but they will increase over the life of the savings plan. (FIG. 11C)
   d. The "Assets & Liabilities Sections" 70 collects all details of the client's holdings. The liability detail includes loan information such as balances, rates and scheduled payments. This information is used to create financial statements for the client. (FIG. 11D)
2. Calculation Phase—the end result is to determine how much a client will need to save and how much insurance is needed to adequately complete their college savings plan.
   a. The "WISE database of colleges" 72 has the current cost details for over 1,500 schools in the United States. The information for each school includes the cost (tuition, room & board). Future costs are calculated by applying an inflation rate to the current costs. Room & Board costs are inflated by the historical inflation rate which is currently 3.1%. The tuition is inflated by 6% and the historical average has been 7%. Both of these inflation rates can be easily changed by the representative. In addition to cost details, the database provides financial aid ratios for each school. While most schools will use the federal methodology for calculating a family's expected contribution, each school handles the amount left over differently. Some schools will fully cover the excess amount. Other schools will only cover a portion of the excess amount. There are also variations in the type of financial aid that each school will provide. Some provide the majority of aid in the form of grants while others will include student loans. The WISE database contains this information for each of the schools.
   b. "Expected Family Contribution" (EFC) 74—The program calculates a families EFC based on the federal methodology. This calculation incorporates the family's income, assets, ages and the number of college age children. All of this information comes from the input sheet.
   c. "Financial Aid" 76—The first step to calculating the financial aid is to determine the total cost of college. This amount, based on the college selected and the students expected start date, comes from the WISE database of colleges. The Expected Family Contribution is taken from the total cost of college. The remaining amount represents the family's financial need. The treatment of this need varies from college to college and can be found in the WISE database of colleges. The amount of need that is met and the form of that met need (loans vs. grants) is calculated. Any unmet need is added to the family's EFC to determine the total cost to the family.

d. "PLUS Loans" 78—These loans are used to pay for college under the WISE Plan. As part of the input page the parent decided to plan for the entire cost of college or the expected amount. The expected amount is after financial aid has been factored in. PLUS loans are than taken for the amount needed in each year. The program calculates the payments needed to service the PLUS loans and consolidates the loans whenever possible to lengthen the term.

e. "Minimum Insurance" 80—The WISE program determines the minimum amount of insurance needed for the plan to work. This calculation is based on the amount to save each month and the total costs to be saved for. There is a maximum amount that can be saved into a plan based on the insurance policy size. You also want to be funding a plan as close to that maximum amount as possible. Lastly, in case of the insured's death, the program calculates the minimum policy size so that at any point in the plan there would be enough value between the death benefit and the cash balance to pay for the planned colleges expenses. The program factors all of these details together to determine the minimum policy size needed.

f. "Family Need Insurance" 82—The family may need insurance beyond college planning. If that is the case, then the costs will go up. The program calculates the amount needed to fund the plan and pay for that insurance.

g. "Insurance Costs" 84—The WISE plan utilizes variable rate insurance products. These products have very specific costs which rely on the health of the insured and the size of the policy. All pertinent information on the insured was taken as part of the input page. The program than determines the cost of insurance based on the specific client. The costs are calculated for both the minimum college planning needs and any additional family need insurance.

h. "Cash Flows" 86—The program creates a spreadsheet showing the detailed cash flows under each of the college saving plan alternatives. The cash flow sheet details all money coming out of the plan. The money being deducted from the plan is from expenses such as sales charges, administrative charges, taxes, insurance related costs, payments to the selected college and, in the case of the WISE plan, payments to service the PLUS loans. With all of the disbursements known the program can calculate the amount needed to be saved into the plan. (FIGS. 12A–12F)

i. "College Savings Plan Alternatives—In addition to the WISE Plan the program calculates the required investment amounts for the following competing plans (FIGS. 13A–13B):
  i. 529 Plan
  ii. Coverdell Savings Plan (ESA)
  iii. UGMA/UTMA accounts
  iv. Roth IRA
  v. Taxable investment account 3. Output Phase—The output provided by the program includes required savings amounts under various college savings plan alternatives, minimum insurance requirements, savings requirements when additional insurance is needed and charts showing aspects of each type of savings plan.

a. "Savings Plan Choices" 88—The program has calculated the cost associated with each of the college savings plan alternatives. These costs are presented on one table with detail on the pros and cons of each plan. The costs are shown in annual as well as monthly amounts. The table also details the total additional costs needed for the other savings plans above the WISE plan costs.

b. "Financials" 90—Based on the information gathered for the input page the program creates a balance sheet, summary debt detail and an income to debt service analysis. (FIG. 14)

c. "Financial Aid" 92—A table detailing the costs of each child going to college. The detail includes total costs, EFC, financial aid breakdown and the total out of pocket costs to the parents. (FIGS. 15A–15B)

d. "Tax vs. COI" 94—Each year the WISE Plan has tax savings since earnings within the plan are tax deferred. There are also Costs of Insurance (COI). This chart presents a comparison of these savings and costs. It also details at what point in time the savings will exceed the costs. There is also a chart presenting the same information but when the full family need insurance is used. (FIGS. 16A–16B)

e. "Net to Heirs" 96—This chart shows the total value that would pass on to the insured's heirs (children, spouse . . . ) in the case of their death. The value is comprised of the insurance death benefit and cash values and for some years the value of the loan forgiveness. (FIG. 17)

f. "Comparison Charts" 98—There are charts presenting the value in the WISE account compared to each of the different savings vehicles analyzed over the life of the client. (FIGS. 18A–18F)

g. "Value of Loan Forgiveness" 100—In the case of the loan holder or child's death any balance in the PLUS loans would be forgiven. This chart shows the value in each year of this feature. (FIG. 19)

h. "Comparison" 102—The program can calculate the total in the WISE account based on different savings levels. Using the savings levels required by each of the other college savings vehicle, this table presents the value in the WISE account at different points in time.

FIGS. 20A–2B show a loan schedule, and FIGS. 21A–21G show a cost summary for the FIG. 10 embodiment.

The Appendices provide implementation details for the embodiment of the invention related to FIGS. 10–21G.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of creating a financial plan for parental funding of a student's college education, the method comprising:

(a) inputting into a computer factors for determining the total estimated present value cost of the student's college education;
   (b) inputting into the computer factors for determining parameters of a variable life insurance policy having an equity component for the parent to be used in funding at least a portion of the student's college education;
   (c) in a computer program, calculating from the inputted factors:
      (i) the total estimated present value cost of the student's college education that must be funded by the parent and the student, and
      (ii) the rate of accumulation of equity of the insurance policy necessary to fund the total estimated present value cost of the student's college education;
   (d) in the computer program, using the rate of accumulation of equity of the insurance policy to calculate the parameters of the insurance policy that will provide for the desired rate of accumulation, the parameters including:
      (i) a face amount,
      (ii) term of payments, and
      (iii) amount of monthly payment;
   (e) creating a financial plan for parental funding of the student's college education, the financial plan specifying:
      (i) the insurance policy parameters,
      (ii) a schedule of estimated college loans to be applied for by the parent for each of the years of attendance by the student,
      (iii) consolidation loan recommendations for consolidation of the annual college loans, including monthly debt servicing amounts for the consolidation loan, and
      (iv) debt servicing recommendations for making withdrawals or loans against the accumulated value of the life insurance policy to pay at least some of the monthly debt servicing amounts of the consolidation loan; and
   (f) providing an output of the financial plan.

2. The method of claim 1 wherein the insurance policy parameters are selected so that the equity of the insurance policy will be sufficient to fund the entire monthly debt servicing amounts for the consolidation loan solely by using withdrawals from the equity of the insurance policy.

3. The method of claim 1 wherein the college loans are PLUS loans.

4. The method of claim 1 wherein the consolidation loans are Sallie Mae consolidation loans.

5. The method of claim 1 wherein the variable life insurance policy is variable universal life insurance.

6. The method of claim 1 wherein the calculations are based upon market rate financial conditions and historical benchmarks for financial performance and college cost projections.

7. The method of claim 1 wherein the output of the financial plan includes at least one of text, charts and graphs.

8. An article of manufacture for creating a financial plan for parental funding of a student's college education, the article of manufacture comprising a computer-readable medium holding computer-executable instructions for performing a method comprising:

(a) inputting into a computer factors for determining the total estimated present value cost of the student's college education;
   (b) inputting into the computer factors for determining parameters of a variable life insurance policy having an equity component for the parent to be used in funding at least a portion of the student's college education;
   (c) in a computer program, calculating from the inputted factors:
      (i) the total estimated present value cost of the student's college education that must be funded by the parent and the student, and
      (ii) the rate of accumulation of equity of the insurance policy necessary to fund the total estimated present value cost of the student's college education;
   (d) in the computer program, using the rate of accumulation of equity of the insurance policy to calculate the parameters of the insurance policy that will provide for the desired rate of accumulation, the parameters including:
      (i) a face amount,
      (ii) term of payments, and
      (iii) amount of monthly payment;
   (e) creating a financial plan for parental funding of the student's college education, the financial plan specifying:
      (i) the insurance policy parameters,
      (ii) a schedule of estimated college loans to be applied for by the parent for each of the years of attendance by the student,
      (iii) consolidation loan recommendations for consolidation of the annual college loans, including monthly debt servicing amounts for the consolidation loan, and
      (iv) debt servicing recommendations for making withdrawals or loans against the accumulated value of the life insurance policy to pay at least some of the monthly debt servicing amounts of the consolidation loan; and
   (f) providing an output of the financial plan.

9. The article of manufacture of claim 8 wherein the insurance policy parameters are selected so that the equity of the insurance policy will be sufficient to fund the entire monthly debt servicing amounts for the consolidation loan solely by using withdrawals from the equity of the insurance policy.

10. The article of manufacture of claim 8 wherein the college loans are PLUS loans.

11. The article of manufacture of claim 8 wherein the consolidation loans are Sallie Mae consolidation loans.

12. The article of manufacture of claim 8 wherein the variable life insurance policy is variable universal life insurance.

13. The article of manufacture of claim 8 wherein the calculations are based upon market rate financial conditions and historical benchmarks for financial performance and college cost projections.

14. The article of manufacture of claim 8 wherein the output of the financial plan includes at least one of text, charts and graphs.

* * * * *

UNITED STATES PATENT AND TRADEMARK OFFICE
CERTIFICATE OF CORRECTION

| | | |
|---|---|---|
| PATENT NO. | : 7,158,950 B2 | Page 1 of 1 |
| APPLICATION NO. | : 11/095990 | |
| DATED | : January 2, 2007 | |
| INVENTOR(S) | : Wesley A. Snyder | |

It is certified that error appears in the above-identified patent and that said Letters Patent is hereby corrected as shown below:

<u>Title page, item (73)</u>

Assignee's should be deleted.

Signed and Sealed this

Twenty-fourth Day of April, 2007

JON W. DUDAS
*Director of the United States Patent and Trademark Office*